United States Patent
Pugh et al.

(10) Patent No.: US 9,592,862 B2
(45) Date of Patent: Mar. 14, 2017

(54) UTILITY VEHICLE WITH ADJUSTABLE WHEEL BASE AND WHEEL STANCE

(71) Applicant: Green Industry Innovators, L.L.C., Louisville, OH (US)

(72) Inventors: Todd Pugh, Louisville, OH (US); Steffon Hoppel, Louisville, OH (US)

(73) Assignee: Green Industry Innovators, L.L.C., Louisville, OH (US)

( * ) Notice: Subject to any disclaimer, the term of this patent is extended or adjusted under 35 U.S.C. 154(b) by 0 days.

(21) Appl. No.: 14/928,602

(22) Filed: Oct. 30, 2015

(65) Prior Publication Data
US 2016/0052567 A1    Feb. 25, 2016

Related U.S. Application Data

(63) Continuation-in-part of application No. 14/224,801, filed on Mar. 25, 2014.

(51) Int. Cl.
| | | |
|---|---|---|
| B62D 49/08 | (2006.01) | |
| B62D 49/06 | (2006.01) | |
| B62D 49/04 | (2006.01) | |

(52) U.S. Cl.
CPC ......... B62D 49/0678 (2013.01); B62D 49/04 (2013.01); B62D 49/0614 (2013.01)

(58) Field of Classification Search
CPC . B62B 23/12; B60B 35/1009; B60B 35/1018; B60B 35/1027; B60B 35/005; B60G 2300/40; B62D 49/0678; B62D 49/08
See application file for complete search history.

(56) References Cited

U.S. PATENT DOCUMENTS

| | | | |
|---|---|---|---|
| 1,967,283 A | | 7/1934 | Brown |
| 2,559,935 A | | 7/1951 | Brown |
| 3,014,734 A | | 12/1961 | Swenson |
| 3,306,390 A | | 2/1967 | Jamme |
| 3,411,804 A | * | 11/1968 | Hill .......................... B62D 7/02 280/124.113 |
| 3,531,137 A | * | 9/1970 | Ganz ..................... B60B 35/003 280/638 |
| 4,265,326 A | | 5/1981 | Lauber |
| 4,363,374 A | * | 12/1982 | Richter .............. B62D 49/0607 172/273 |
| 4,834,409 A | | 5/1989 | Kramer |
| 6,213,218 B1 | | 4/2001 | Miller |

(Continued)

*Primary Examiner* — Bryan Evans
(74) *Attorney, Agent, or Firm* — Sand & Sebolt

(57) ABSTRACT

A utility vehicle with adjustable wheel assemblies to accommodate different weight attachments selectively engageable with the vehicle. Adjustment assemblies are provided to engage each of the front wheel assemblies. Each adjustment assembly includes a guide plate, a first arm of a first length and a second arm of a second length. The operator will select the appropriate one of the first and second arms to secure to the guide plate and to one of the front wheel assemblies. The guide plates include holes therein for locking the selected one of the arms in a particular orientation. This is accomplished by inserting a pin through an aperture in the selected first or second arm and one of the holes in the guide plate. A first end of the selected first or second arm is secured to the guide plate and a second end thereof is engaged with the associated wheel assembly.

22 Claims, 20 Drawing Sheets

(56) References Cited

U.S. PATENT DOCUMENTS

| | | |
|---|---|---|
| 7,252,169 B2 | 8/2007 | McLean et al. |
| 7,832,741 B2 | 11/2010 | Donaldson |
| 8,887,841 B2 | 11/2014 | Oswald et al. |
| 8,888,122 B2 | 11/2014 | Berry |

* cited by examiner

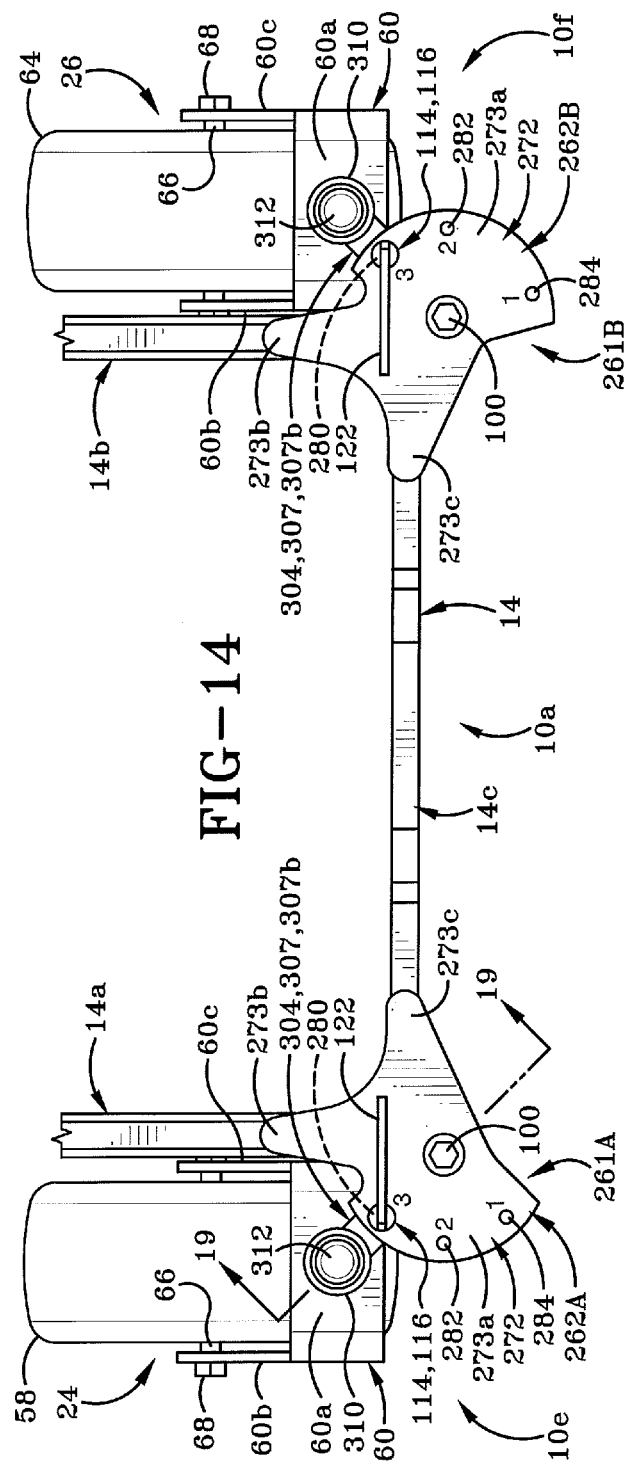
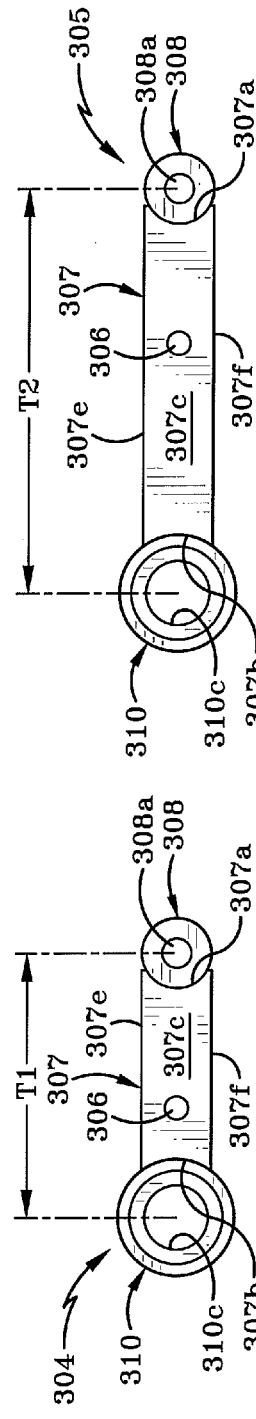
FIG-14
FIG-15
FIG-16

UTILITY VEHICLE WITH ADJUSTABLE WHEEL BASE AND WHEEL STANCE

CROSS-REFERENCE TO RELATED APPLICATIONS

This is a Continuation-in-Part of U.S. patent application Ser. No. 14/224,801, filed Mar. 25, 2014, the entire specification of which is incorporated herein by reference.

BACKGROUND OF THE INVENTION

Technical Field

This invention relates generally to powered vehicles. More particularly this invention relates to a utility vehicle that is used for a variety of purposes by securing a range of different attachments to the vehicle. Specifically, this invention is directed to a utility vehicle that has adjustable front wheel assemblies that enable a user to change the wheel base (distance between the front and rear wheels) and the wheel stance (distance between the left wheels and the right wheels) so as to strike a balance of the overhung load, i.e., the load due to the weight of the attachment engaged with the vehicle, versus the weight of the rest of the vehicle and the operator relative to the performance of the attachment being engaged therewith.

Background Information

Mowers and other vehicles frequently have to be driven over uneven or sloped terrain. This makes it particularly important that the mower or vehicle be as balanced and stable as possible when traveling over such terrain. The balance and stability of the vehicle is important as it affects the performance of the vehicle and of any attachments engaged therewith.

Landscapers may utilize vehicles that allow one or more attachments to be engaged with a front end, a rear end, or a side of the vehicle. Such attachments could include mower assemblies, mulching assemblies, edgers, and even snowplow blades or snow blowers. These attachments seldom are of similar weights. Thus, depending on the particular attachment engaged with the vehicle and the location of that attachment, i.e., side or front of the vehicle, the overhung load on the vehicle will differ.

There is therefore a need in the art for an improved utility vehicle that enables a wide range of different attachments of different weights to be engaged therewith without increasing the tendency of the vehicle to become unstable and thereby decreasing the performance of the vehicle and/or the attachment.

SUMMARY

A utility vehicle including adjustable wheels assemblies is disclosed.

In one aspect, the invention may provide a utility vehicle having a frame with a front end and a rear end and vehicle which is adapted to engage at least two attachments thereon which are of different weights; a right and left rear wheel mounted proximate the rear end of the frame; and a right and left front wheel assembly mounted proximate the front end of the frame; said front wheel assemblies each including a front wheel; and wherein the front wheels are spaced a first distance from each other and a second distance from the rear wheels; and wherein one or both of the front wheel assemblies are selectively adjustable so as to vary one or both of the first distance and the second distance in order to balance the overhung load (i.e., the attachment) versus the rest of the vehicle plus the operator (the ballast for the overhung load) relative to the performance of the attachment.

The first distance between the left and right front wheels is referred to herein as the wheel stance. The second distance between the front wheels and the rear wheels is referred to herein as the wheel base.

The ability to adjust the wheel stance and/or the wheel base may affect the vehicle's agility and the traction of the drive wheels. Furthermore, being able to move an engagement point of an attachment toward the vehicle's body also tends to shorten the wheel base and widen the wheel stance. This is particularly important when attachments are engaged so as to extend outwardly from the side of the utility vehicle. A side load may cause a shearing effect on the traction of the drive wheels. The further out an attachment is located relative to the body of the vehicle, the less side load it may take to break traction at the drive wheels. The ability in the utility vehicle in accordance with an aspect of the present invention to shorten the wheel base and widen the wheel stance tends to increase traction at the drive wheels and thereby tends to enhance the agility and performance of the vehicle. The more stable the vehicle, the better contact the attachment will have with the terrain over which the vehicle travels and thus the more effective the attachment will be.

In another aspect of the invention the selective adjustment of one or both of the right and left front wheel assemblies simultaneously adjusts the first and second distances. Still further, the rear wheels and front wheels are adapted to contact a ground surface and retain the frame at an operational height relative to the ground surface prior to the selective adjustment of one or both of the right and left front wheel assemblies; and wherein the operational height of the frame remains substantially the same after selective adjustment of one or both of the right and left front wheel assemblies. The right and left front wheel assemblies are independently adjustable.

In another aspect, the invention may provide a system including at least two attachments; each attachment being adapted to perform a different function, and wherein a first one of the attachments is of a different weight to a second one of the attachments; and a utility vehicle comprising a frame having a front end and a rear end and wherein one of the first and second attachments is selectively engageable with the frame; a left and a right rear wheel mounted proximate the rear end of the frame; and a left and a right front wheel assembly mounted proximate the front end of the frame; said front wheel assemblies each including a front wheel; and wherein the front wheels are spaced a first distance from each other and a second distance from the rear wheels; and wherein one or both of the front wheel assemblies are selectively adjustable so as to vary one or both of the first distance and the second distance in accordance with the weight of the engaged one of the first and second attachments.

In accordance with another aspect, the invention may provide a system in which the rear wheels and front wheels are adapted to contact a ground surface and retain the frame at an operational height relative to that ground surface; and wherein the selective adjustment of one or both of the front wheel assemblies does not result in a change in the operational height of the vehicle frame relative to the ground surface. The right and left front wheel assemblies are independently adjustable and the first and second distances are varied simultaneously when either of the front and left wheel assemblies is adjusted.

In another aspect, the invention may provide a method of changing a utility vehicle's weight ratio, i.e., ratio of the weight of the attachment relative to the weight of the rest of the vehicle plus the operator. The vehicle's weight ratio is changed when different weight attachments are engaged with the vehicle. The utility vehicle includes a pair of laterally spaced apart first wheel assemblies and a pair of laterally spaced apart second wheels, where the second wheels are spaced longitudinally from the first wheel assemblies. The method of changing the vehicle's weight ratio includes adjusting one or both of the first wheel assemblies so that the first wheel assemblies simultaneously move both laterally and longitudinally relative to the second wheels.

The step of adjusting the first wheel assemblies does not raise the operational height of the utility vehicle's frame relative to a ground surface upon which the first wheel assemblies and the second wheels rest. Furthermore, the wheel assemblies may be adjusted independently of each other.

The step of adjusting one or both of the first wheel assemblies may comprise lifting the weight of the vehicle off the first wheel assemblies; disengaging a locking member holding a first one of the first wheel assemblies in a first orientation relative to the vehicle's frame; moving the first one of the first wheel assemblies to a second orientation relative to the vehicle's frame; and engaging the locking member to hold the first wheel in the second orientation.

In another aspect the invention may provide a utility vehicle comprising a frame having a pair of rear wheels mounted thereon; a right front wheel assembly and a left front wheel assembly; and an adjustment assembly for mounting each of the right and left front wheel assemblies to the frame and wherein the adjustment assembly selectively changes a position of the associated right or left front wheel assembly relative to the rear wheels or to each other.

In yet another aspect the invention may provide an adjustment assembly for securing a wheel assembly to a frame of a zero-turn utility vehicle, said adjustment assembly comprising a guide plate adapted to be secured to the frame of the vehicle; a first arm of a first length; and a second arm of the second length; and wherein one or the other of the first and second arms is selectively engageable between the guide plate and the wheel assembly.

In a still further aspect the invention may provide a method of adjusting a wheel base or wheel stance of a utility vehicle comprising the steps of securing first and second guide plates to a front portion of a frame of the utility vehicle a distance apart from each other; providing a pair of first arms of a first length and a pair of arms of a second length; selecting a first one of the pair of first arms or of the pair of second arms; engaging the selected first one of the pair of first or second arms with a first wheel assembly and the first guide plate; selecting a second one of the pair of first arms or of the pair of second arms; engaging the selected second one of the pair of first or second arms with a second wheel assembly and the second guide plate.

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims.

FIG. 14 is a top view of a third embodiment of the front wheel assembly in accordance with an aspect of the present invention;

FIG. 15 is a top view of a first arm selectively utilized in the front wheel assembly of FIG. 14;

FIG. 16 is a top view of a second arm selectively utilized in the front wheel assembly of FIG. 14;

Similar numbers refer to similar parts throughout the drawings.

DETAILED DESCRIPTION

Figure 1:
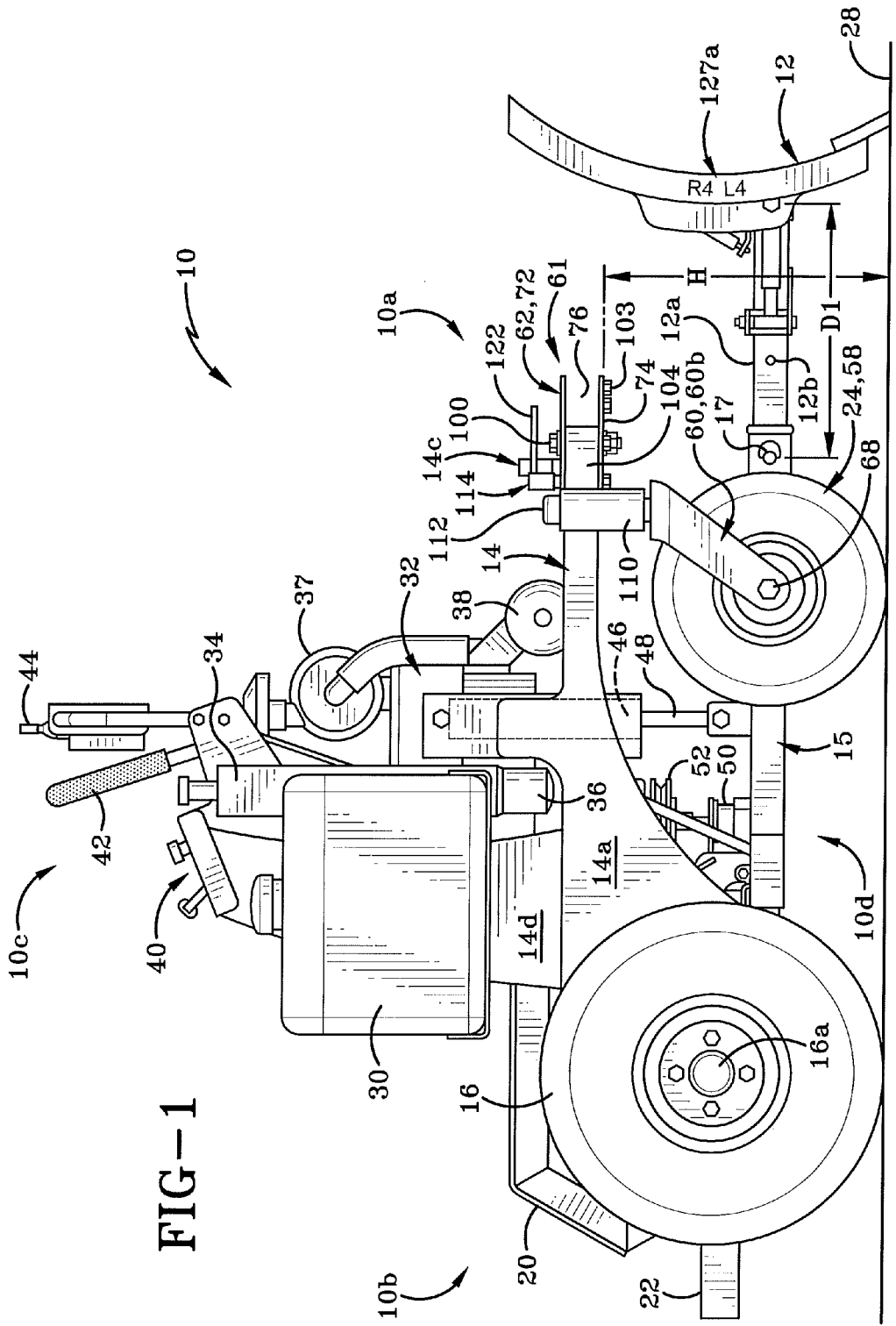
FIG. 1 is a right side view of a utility vehicle in accordance with an aspect of the invention, which vehicle is illustrated with a snowplow blade attachment engaged therewith.

Referring to FIG. 1 there is shown a utility vehicle in accordance with an aspect of the present invention, generally indicated at 10. The utility vehicle preferably is a zero-turn, stand-on unit (i.e., the operator stands on a platform instead of sitting on a seat); and, more specifically, the vehicle is a zero-turn, stand-on mower. It will be understood, however, that a wide range of different vehicles other than mowers could be fabricated as disclosed herein, such as snowblowers, for instance. The term "utility vehicle" will be used herein to denote any vehicle utilizing aspects of the invention as disclosed. The term "zero-turn" is used to reference the fact that the utility vehicle or mower has a turning radius that is essentially zero; in other words the utility vehicle or mower is capable of pivoting or turning readily and easily around a mid-point between the drive wheels of the vehicle or mower or around one or the other of the drive wheels.

Utility vehicle 10 has a front end 10a, a rear end 10b, a top 10c, a bottom 10d, a right side 10e, and a left side 10f. The front end 10a and rear end 10b define a longitudinal direction between them. The top 10c and the bottom 10d define a vertical direction between them. The right side 10e and left side 10f define a horizontal or lateral direction between them.

Utility vehicle 10 may be used for a wide variety of purposes by selectively attaching thereto any one of a number of different attachments including but not limited to a mower deck assembly, a snowplow blade, a snow blower or snow thrower, an edger, a forklift assembly, a brushcutter, a roller assembly, an aerator, a vacuum assembly, and so on.

Figure 13:
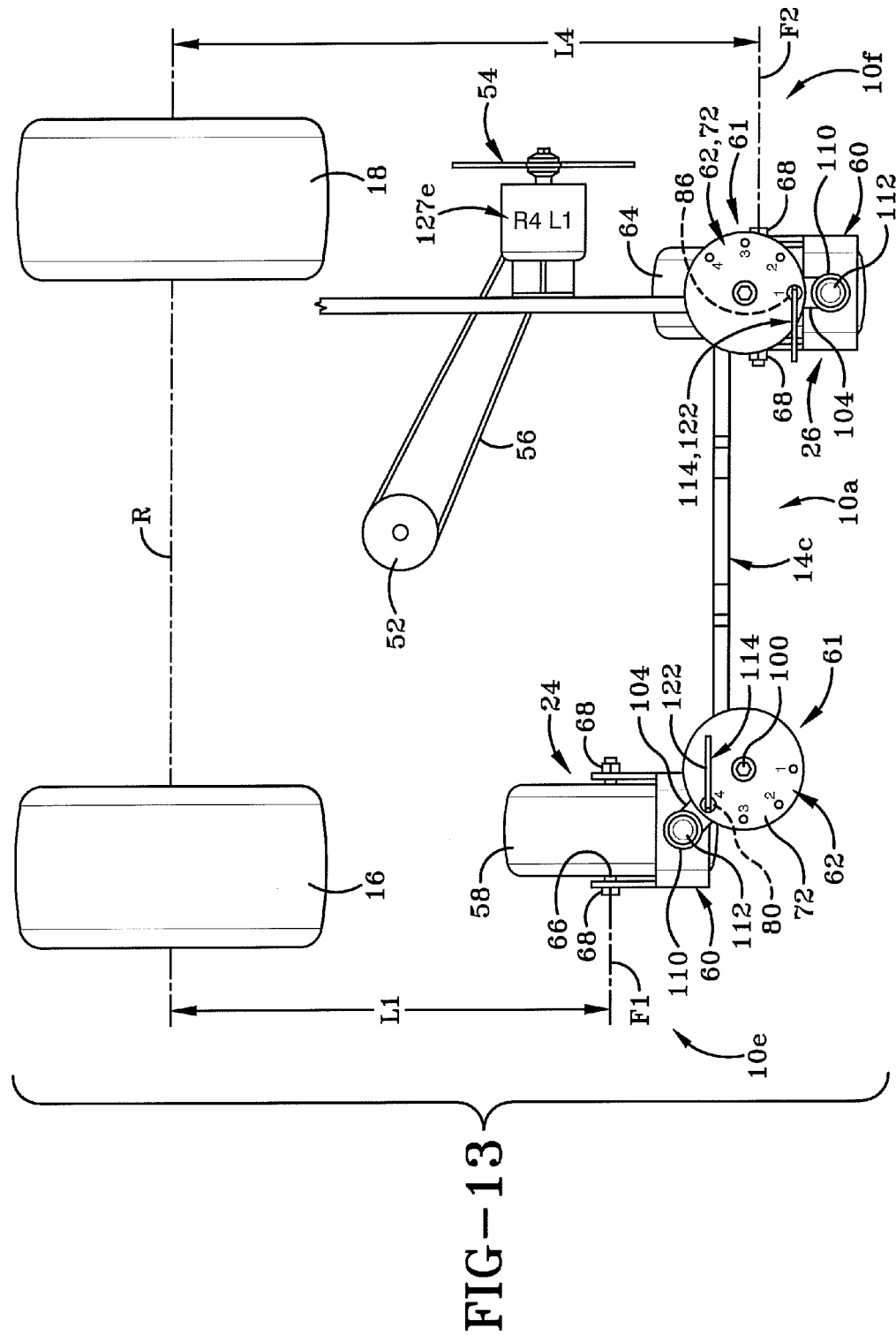
FIG. 13 is a top view of the front wheel assemblies and the rear wheels showing the relative distances between the various wheels when the right wheel assembly is in the first position and the left wheel assembly is in a fourth position so that the right and left front wheels are out of lateral alignment with each other and the utility vehicle is configured to have a side-mounted attachment secured to the frame.

As will be understood, these various attachments range widely in size and weight. By way of example, FIG. 1 illustrates utility vehicle 10 having a snowplow blade 12 engaged therewith and FIG. 13 shows an edger assembly 54 attached thereto (with most of the vehicle 10 omitted for clarity). Obviously, snowplow blade 12 is much heavier than edger assembly 54 and thus the vehicle's center of gravity will tend to be in two different locations in these two instances.

Furthermore, the weight ratio, i.e., the balance between the weight of the overhung load (the snowplow blade 12 or edger assembly 54) versus the weight of the rest of the vehicle plus the operator on platform 22, is changed when the different attachments 12, 54 are engaged with vehicle 10. This weight ratio has to be separately balanced for each attachment 12 or 54 so that the performance of the vehicle 10 is optimized for the particular attachment. The balancing of the weight ratio, in turn, optimizes the performance of the attachment. The manner of achieving this balance is described further herein.

Figure 4:
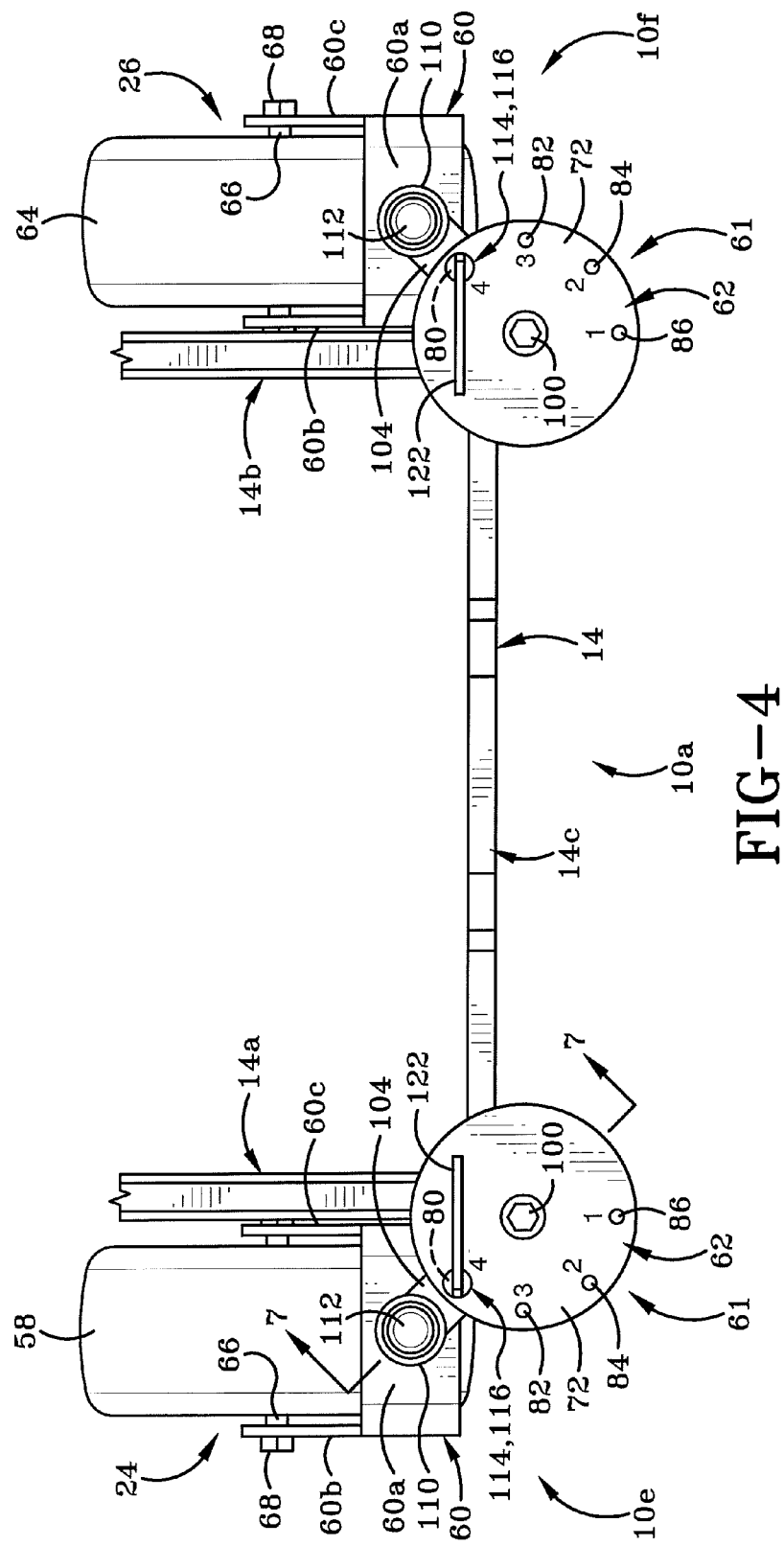
FIG. 4 is a top view of the right front wheel assembly taken along line 4-4 of FIG. 3.

As is best seen in FIGS. 1 and 4, utility vehicle 10 includes a rigid frame 14, typically fabricated from metal and extending from front end 10a to rear end 10b and from right side 10e to left side 10f. Frame 14 includes, amongst other components, right and left side members 14a, 14b, a front member 14c and upstanding members 14d that extend outwardly and upwardly from left and right side members 14d. Right and left side members 14a, 14b extend longitudinally from proximate front end 10a to proximate rear end 10b. Front member 14c extends horizontally or laterally between right and left side members 14a, 14b. It will be understood that frame 14 may include other cross-braces and members that are not illustrated or described herein for the sake of clarity and brevity.

A support member 15 is pivotally secured to a portion of frame 14 and extends longitudinally forwardly toward and beyond front end 10a. Any attachments that are secured to front end 10a of vehicle 10 may be detachably engaged with support member 15. Such attachments will be engaged with support member 15 at an engagement point (the location of a locking mechanism 17 in FIG. 1, for instance).

Thus, as illustrated in FIG. 1, snowplow blade 12 is secured to a front end of support member 15 by locking mechanism 17, in this instance a locking pin. Snowplow blade 12 includes a shaft 12a that extends rearwardly therefrom and is received within a bore (not shown) of support member 15. Pin 17 is selectively inserted through one of a series of aligned holes (not shown) in the blade's shaft 12a and in support member 15. It should be noted that a series of spaced apart holes, such as hole 12b, is defined in shaft 12a. Any one of these holes, such as hole 12b, may be brought into alignment with a hole in support member 15 and the pin 17 inserted therethrough. Pin 17 is then secured in place in an appropriate way, such as by means of a clevis pin. Thus the distance "D1" (FIG. 1) between snowplow blade 12 and vehicle 10 may be varied as desired and in accordance with the particular attachment being engaged with vehicle 10. Increasing distance "D1" moves the attachment, e.g. snowplow blade 12, further from the vehicle's body and increases the overhung load. Decreasing distance "D2" moves the snowplow blade 12 closer to the vehicle's body and decreases the overhung load. The ability to change distance "D1" in response to the overhung load resulting from the engagement of any particular attachment with vehicle 10 may tend to improve the performance of that particular attachment. Additionally, changing the wheel base and wheel stance of vehicle 10 may tend to improve the performance of that particular attachment. So, for example, in the case of snowplow blade 12, balancing the weight ratio ensures that vehicle 10 will move stably over surface 28 and thus snowplow blade 12 will remain in adequate contact with surface 28 and be more effective at removing snow therefrom.

If a different attachment is to be secured to front end 10a, locking mechanism 17 is disengaged, snowplow blade 12 is removed and the different attachment is secured to support member by a shaft extending outwardly therefrom in the bore of support member 15 and inserting locking pin 17 through a pair of aligned holes in the shaft and support member 15.

Figure 9:
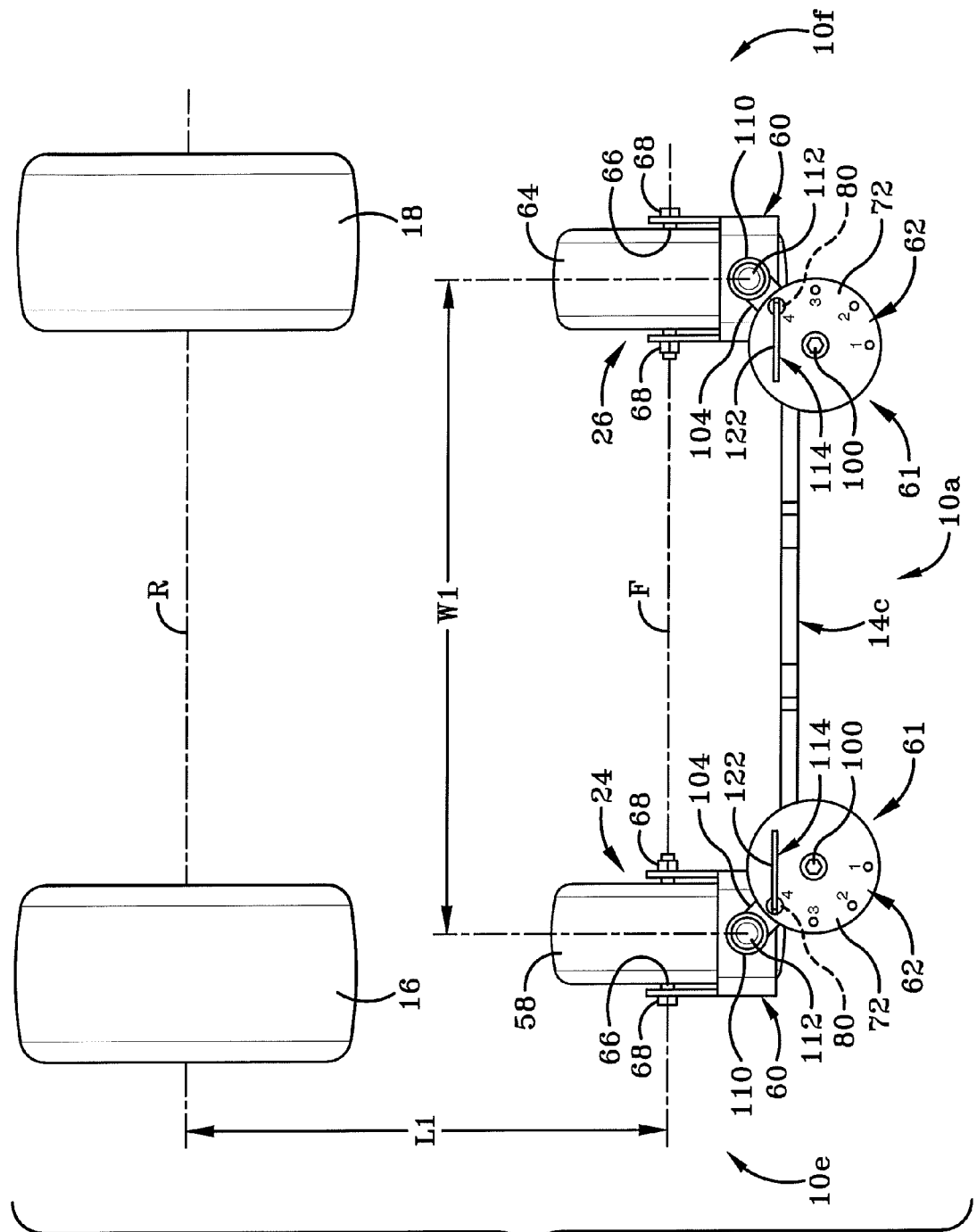
FIG. 9 is a top view of the front wheel assemblies and the rear wheels showing the relative distances between the various wheels when each of the right and left front wheel assemblies are in a first position.

Utility vehicle 10 is provided with powered (i.e., driven) right and left rear wheels 16, 18 (FIGS. 1 and 9). These drive wheels are each operatively mounted on frame 14 via an axle 16a (FIG. 1). Axle 16a may be a single axle that extends between right and left rear wheels 16, 18 or each wheel 16, 18 may have its own axle 16a. Rear wheels 16, 18 rotate about an axis "R" (FIG. 9) that extends through axel 16a. Right front wheel 58 and left front wheel 64 (FIG. 3) may be of substantially the same diameter as each other and this diameter may be smaller than the diameter of right and left rear wheels 16, 18. Preferably, a mud-flap 20 is positioned adjacent a top surface and interior side surface of each of right and left rear wheels 16, 18 to prevent mud and water from splashing upwardly toward an operator standing on a platform 22 at rear end 10b. Mud-flaps 20 and platform 22 are all mounted on frame 14. (It will be understood that a seat may be provided on utility vehicle 10 instead of platform 22 and this seat would also be mounted on frame 14.)

Non-powered right and left front wheel assemblies 24, 26 are mounted on frame 14 proximate front end 10a of utility vehicle 10. Wheel assemblies 24 and 26 will be described in greater hereinafter. In accordance with an aspect of the invention, vehicle 10 includes a mechanism for adjusting the wheel base and adjusting the wheel stance which will ensure the optimum balance between the ratio of the weight at a front or side of vehicle 10 due to a particular attachment with the weight of the rest of the vehicle 10 plus the operator, relative to the performance of the attachment. The term "wheel base" denotes the distance between rear wheels 16, 18 and front wheel assemblies 24, 26. The term "wheel stance" denotes the distance between right wheel assembly 24 and left wheel assembly 26. In the vehicle 10 illustrated herein, the distance between rear wheel 16 and rear wheel 18 is not adjustable simply because the majority of the vehicle's weight is typically carried toward rear end 10b. This weight includes the weight of the engine and of the operator. It will be understood, however, that in other types of vehicles it may be desirable to adjust the distance between the left and right rear wheels in the manner that will be described herein with respect to the left and right front wheels.

Rear wheels 16, 18 and right and left wheel assemblies 24, and 26 are positioned to engage a ground surface 28 and roll over that ground surface 28 to move the utility vehicle 10 in a forward direction or rearward direction as well as to the left or right. Preferably, utility vehicle 10 is a zero-turning radius machine but it will be understood that utility vehicle 10 may be differently configured to enable it to give it a wider turning range.

Various other components of utility vehicle 10 are mounted on frame 14. These include a gas tank 30, an engine 32, an oil tank 34 with an oil filter 36 for the engine 32, an air filter 37, and a muffler 38 to dampen noise. A control panel 40 is also mounted on an upstanding member 14d of frame 14 and is used to control various functions of utility vehicle 10. One or more hand-operable levers 42 are operatively engaged with rear wheels 16, 18. Only one of these levers 42 is illustrated in FIGS. 1 and 9, namely the lever that controls the right rear wheel 16. It will be understood that a similar lever is provided for controlling the left rear wheel 18. A console which may include a joystick 44 is also provided on utility vehicle 10. Joystick 44 may be used to operate a hydraulic system that controls the snowplow blade 12 or any other attachment engaged with utility vehicle 10.

Much of the hydraulic system provided on vehicle 10 is not illustrated in FIGS. 1 and 9 as the provision and operation of the same is well known in the art and is not particularly relevant to the present invention. Two components of the hydraulic system that are illustrated in the figures are the hydraulic cylinder 46 with piston 48 and a hydraulic pump 50. Cylinder 46 and piston 48 are operatively engaged with a rear region of support member 15 and are activated to raise and lower support member 15 as will later be described herein.

Another component that is mounted on frame 14 is a pulley 52 (FIGS. 1, 9 and 11) that may be used for operating a side-mounted attachment such as the edger 54 shown in FIG. 13. A drive belt 56 is engaged with pulley 52 to drive edger 54, as will be later described herein.

As indicated previously herein, right and left front wheel assemblies 24, 26 are engaged with frame 14. Right and left front wheel assemblies 24, 26 are mirror images of each other but the components and functioning of those components are substantially identical. Only right front wheel assembly 24 will therefore be described herein but it will be understood that the left front wheel assembly 26 is substantially identical in structure and function.

Right front wheel assembly 24 is a caster-type assembly and includes a right front wheel 58 and a yoke 60 that is secured thereto in such a manner that wheel 58 is able to pivot through 360° about a vertical axis "Y". In accordance with an aspect of the invention, right front wheel assembly 24 is operatively engaged with frame 14 via an adjustment assembly 61. The adjustment assembly 61 includes a guide plate 62, an arm 104 with a sleeve 110 at one end that engages a yoke 60, and a pin 114. All of these components will be further described herein.

Figure 2:
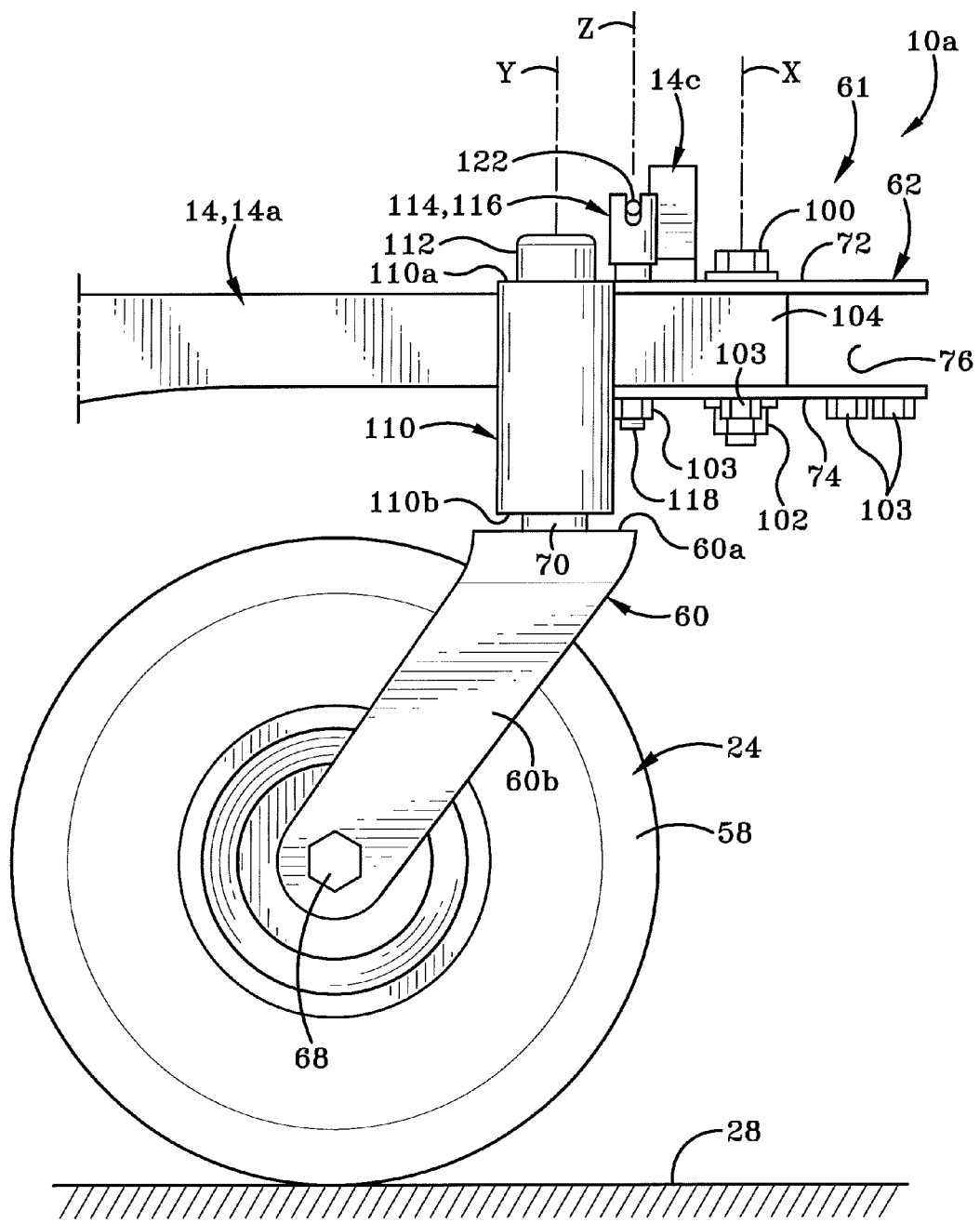
FIG. 2 is an enlarged right side view of a first embodiment of a right front wheel assembly of the utility vehicle of FIG. 1.
Figure 3:
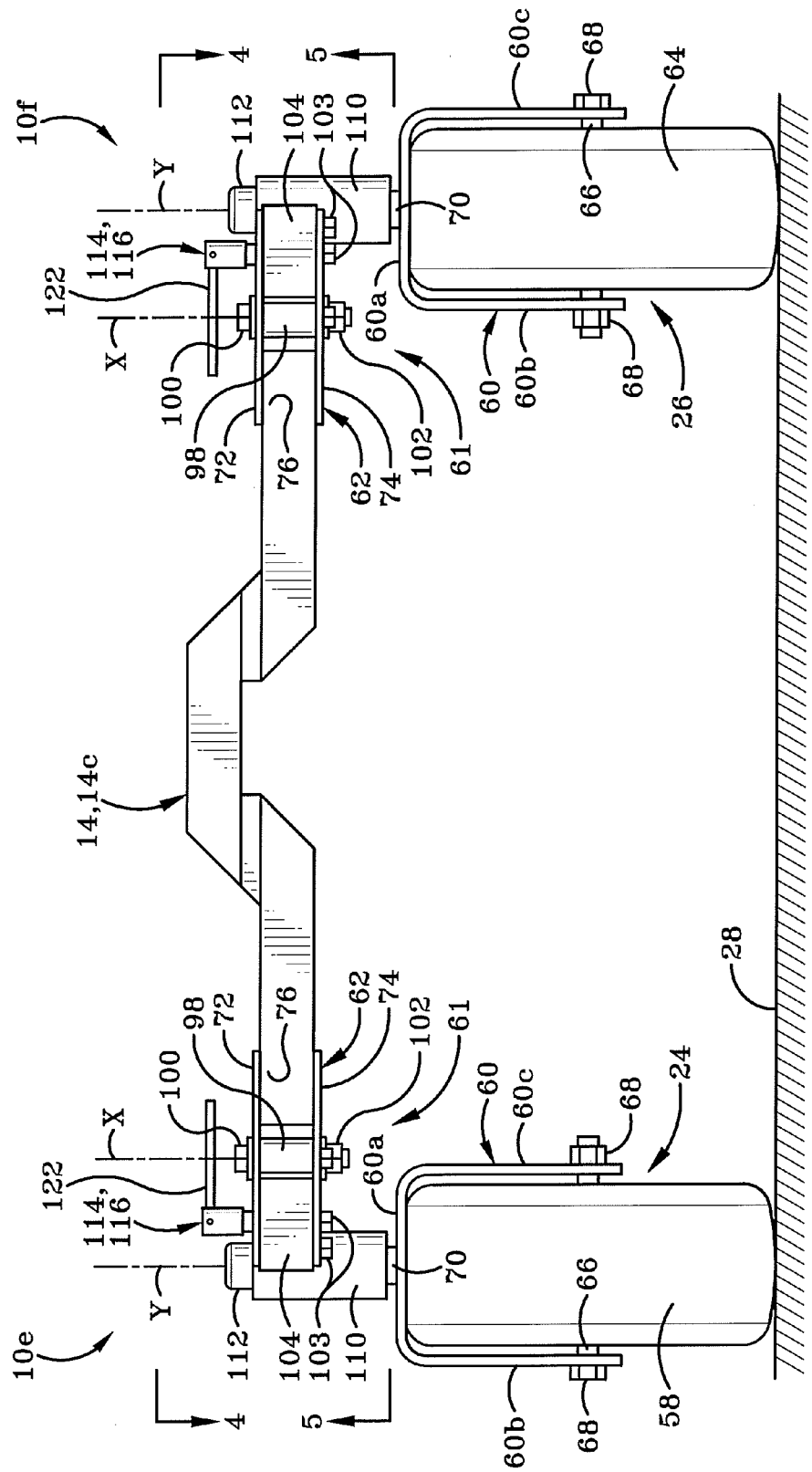
FIG. 3 is a front view of the right front wheel assembly with the rest of the utility vehicle omitted for the sake of clarity.
Figure 6:
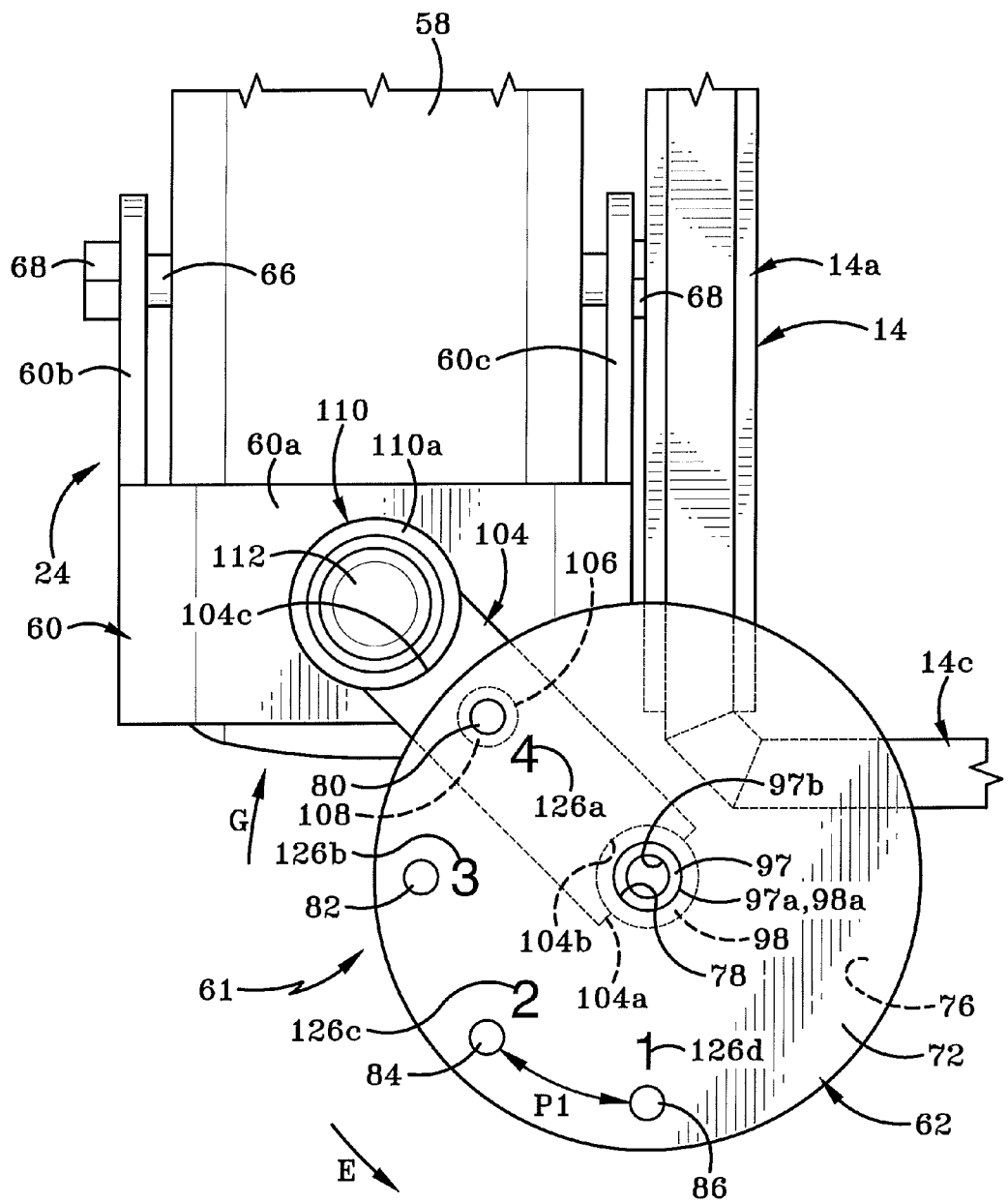
FIG. 6 is an enlarged top view of the right front wheel assembly with the pin removed therefrom for clarity.

Yoke 60 comprises a substantially U-shaped bracket having a base 60a and two arms 60b, 60c that extend downwardly and rearwardly from base 60a, as best seen in FIGS. 2, 3, and 6. Holes (not shown) are defined in a lower region of each arm 60b, 60c and these holes are laterally aligned with each other. A fastener 68 secures wheel 58 to yoke 60. A shaft 66 of a bolt 68 is passed through these aligned holes and through a hole (not shown) in wheel 58. A nut is then engaged with shaft 66 to secure bolt 68 in place. The shaft 66 thus becomes an axle for wheel 58 and wheel 58 rotates about an axis passing through this shaft. This axis is represented in FIG. 9 by the reference character "F".

A cylindrical shaft 70 extends upwardly and outwardly from base 60a of yoke 60 and is disposed substantially at right angles to an upper horizontal surface of base 60a. This can be seen in FIG. 3.

Guide plate 62 comprises two spaced-apart discs 72, 74 that are disposed one above the other and preferably are aligned with each other. Discs 72 and 74 are substantially parallel and define a gap 76 therebetween. Portions of frame 14a and 14c are received in gap 76 and are welded to discs 72 and 74 thereby maintaining discs 72, 74 in a fixed relationship relative to frame 14 and relative to each other. This is illustrated in FIG. 6.

Figure 5:
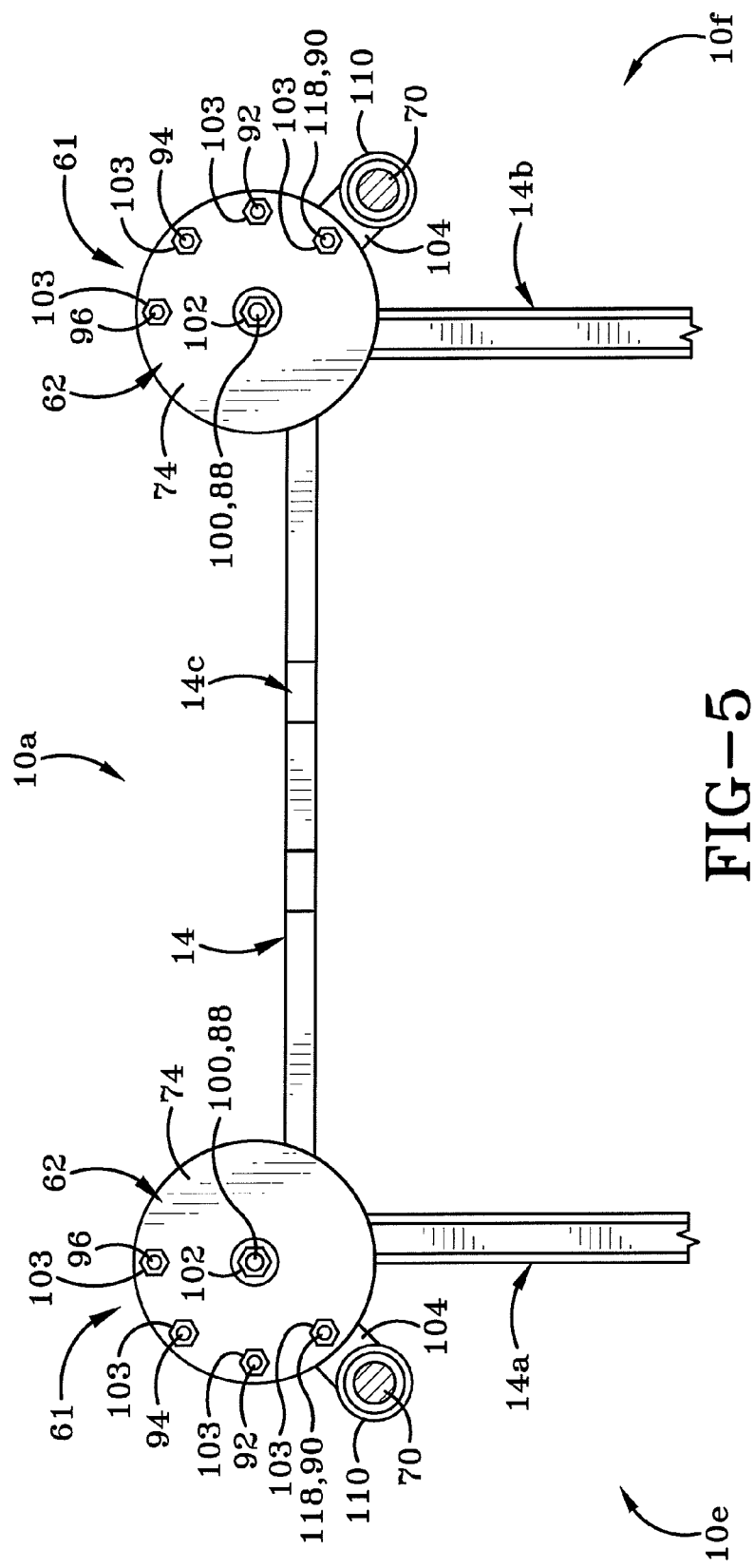
FIG. 5 is a bottom view of the right front wheel assembly taken along line 5-5 of FIG. 3.

Referring to FIGS. 5 and 6, each disc 72, 74 is substantially identical in shape and that shape preferably is circular. A central hole 78 (FIG. 6) is defined in plate 72 and one or more additional holes are defined a spaced distance inwardly from a circumferential outer edge 72a of disc 72. Preferably, disc 72 defines four such holes therein with those holes being a first hole, a second hole, a third hole and a fourth hole, identified by the reference characters 80, 82, 84, and 86, respectively. Holes 80, 82, 84, and 86 are all of substantially the same diameter and are arranged and spaced at regular intervals from each other in a pattern along an arc. Preferably, the holes 80-86 are spaced about a distance "P1" (FIG. 6) apart from each other along the arc. The distance "P1" preferably is about 4 inches. It should be noted that the distance "P1" between adjacent holes 80-86 can convert about 200 pounds or more capacity depending on which position right and front wheel assemblies are adjusted to, as will be described hereafter.

Figure 7:
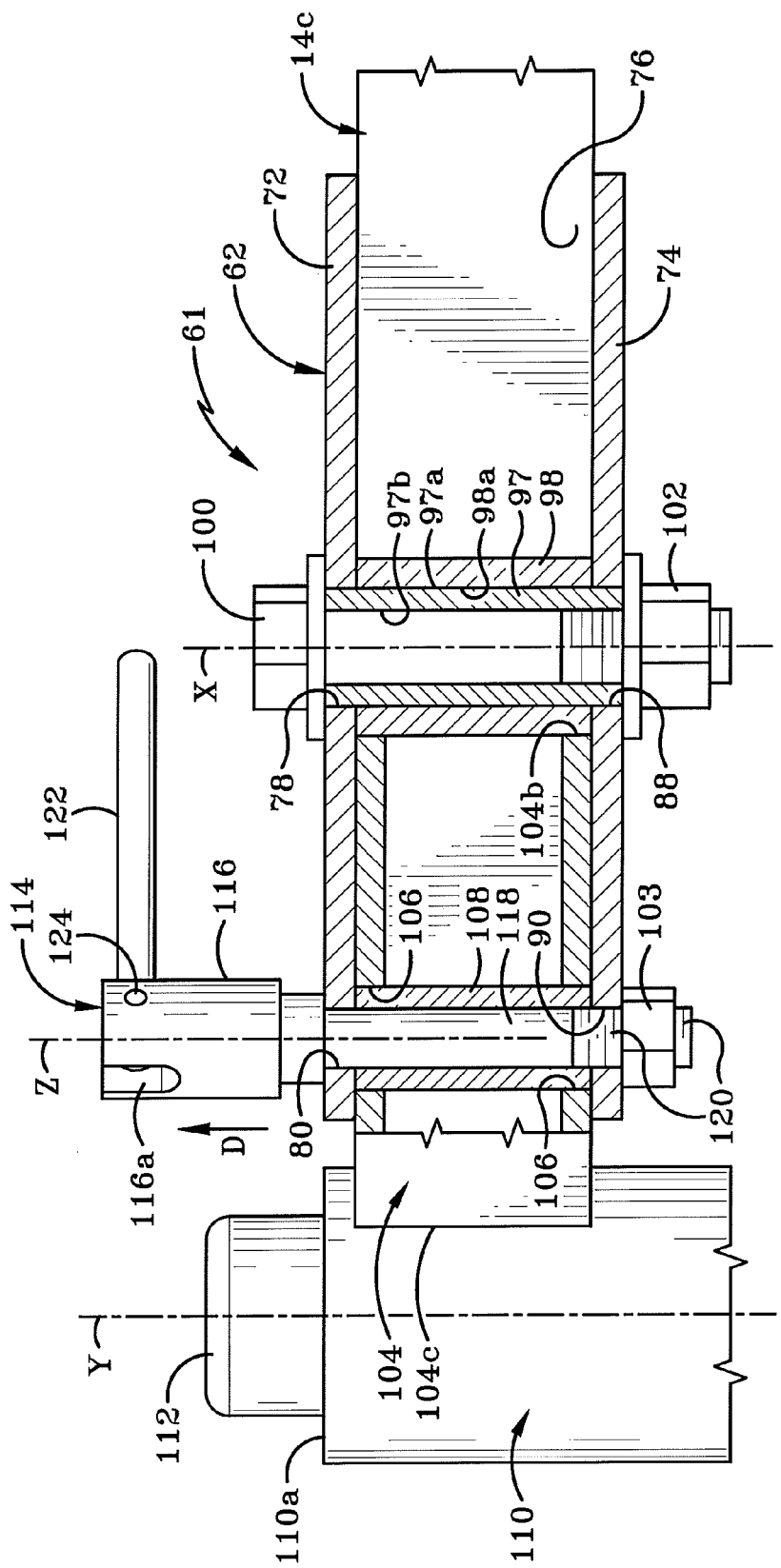
FIG. 7 is a partial cross-sectional view of the adjustment assembly and part of the yoke taken along line 7-7 of FIG. 4.

Similar holes are defined in plate 74. So, plate 74 defines a central hole 88 (FIG. 5) and four additional holes 90, 92, 94, and 96 therein. Hole 78 is vertically aligned with hole 88, hole 80 is vertically aligned with hole 90, hole 82 is vertically aligned with hole 92, hole 84 is vertically aligned with hole 94, and hole 86 is vertically aligned with hole 96. Preferably, a tube 97 extends through holes 78 and 88 and is welded in place. A bushing 98 surrounds tube 97 and extends between an interior surface of plate 72 and an interior surface of plate 74. The interior surface 98a of bushing 98 is adjacent the exterior surface 98a of tube 97. Tube 97 defines a bore 97b through which a threaded bolt 100 is received. A threaded nut 102 secures bolt 100 in place. Bolt 100 and nut 102 also keep plates 72 and 74 aligned and secured together. As best seen in FIG. 7, an axis "X" extends through the bore 97b of tube 97 and from upper plate 72 through to lower plate 74. Guide plate 62 acts as an anchor for the adjustment of the position of wheel 58.

Referring to FIG. 5 it can be seen that a plurality of nuts 103 is welded to the underside of plate 74. Each nut 103 is disposed such that an aperture (not numbered) defined therein aligns with one of the respective hole 90, 92, 94, or 96 in plate 74.

As indicated above, adjustment assembly 61 includes an arm 104 that is adjustably engaged with guide plate 62. As shown in FIG. 6, arm 104 has a first end 104a, including a curved region 104b, and a second end. As shown in FIG. 7, arm 104 is complementary in height to the gap 76 between plate 72 and plate 74. First end 104a of arm 104 is received into gap 76 and curved region 104b, which is complementary to a portion of the exterior surface of bushing 98, is positioned adjacent bushing 98 and is welded thereto. Arm 104 defines a pair of aligned apertures 106 in its upper and lower surfaces (FIG. 7) and a bushing 108 extends from a first aperture 106 to the second aperture 106 and is welded to arm 104. Arm 104 is rotatable about an axis "X" that extends along bolt 100. As arm 104 rotates about axis "X", apertures 106 in the arm are selectively alignable with one of the pairs aligned holes 80/90, 82/92, 84/94, or 86/96 in guide plate 62.

Second end 104c of arm is welded to sleeve 110. FIG. 6 shows that second end 104c defines a curvature that is complementary to the exterior surface of sleeve 110. Although not illustrated herein, it will be understood that sleeve 110 defines a bore therethrough that extends from an upper end 110a (FIG. 2) on sleeve 110 through to a lower end 110b thereof. Shaft 70 of yoke 60 is received through this bore. Shaft 70 is inserted into an opening (not shown) in the lower end 110b of sleeve 110. A cap 112 is inserted into an opening (not shown) in upper end 110a of sleeve 110 to lock shaft 70 in place within sleeve 110. FIG. 2 shows an axis "Y" passing centrally along the bore of sleeve 110 and running from upper end 110a of sleeve 110 through to lower end 110b thereof. Shaft 70 and therefore yoke 60 and wheel 58 are rotatable about this axis "Y". In particular, shaft 70, yoke 60, and wheel 58 are able to rotate through 360°.

Pin 114 (FIG. 7) is selectively removably engageable with one of the aligned pairs of holes in guide plate 62. Pin 114 comprises a head 116 having a shaft 118 extending outwardly and downwardly therefrom. An end of shaft 118 is provided with threads 120. Shaft 118 is of a diameter sufficient to permit it to pass through any of the aligned pairs of holes 80/90, 82/92, 84/94, or 86/96. Furthermore, shaft 118 and threads 120 are configured for mating engagement with any of the nuts 103 disposed adjacent holes 90, 92, 94 or 96. Pin 114 further includes a U-shaped slot 116a defined in head 116. One end of a handle 122 is received through slot 116a and a fastener 124 locks that end of the handle 122 to head 116. The handle 122 provides an easier means for a user to grasp in order to manipulate pin 114.

Referring to FIG. 6, it will be seen that an indicator is marked on upper surface of upper plate 72 adjacent each of holes 80, 82, 84, and 86. The indicator adjacent hole 80 is identified by reference character "126a", the indicator adjacent hole 82 is identified by the reference character "126b"; the indicator adjacent hole 84 is identified by the reference character "126c"; and the indicator adjacent hole 86 is identified by the reference character "126d". These indicators 126a-126d are visible to the operator and enable him or her to select which of the holes 80-86 to engage pin 114 therein, as will be hereafter described.

Figure 10:
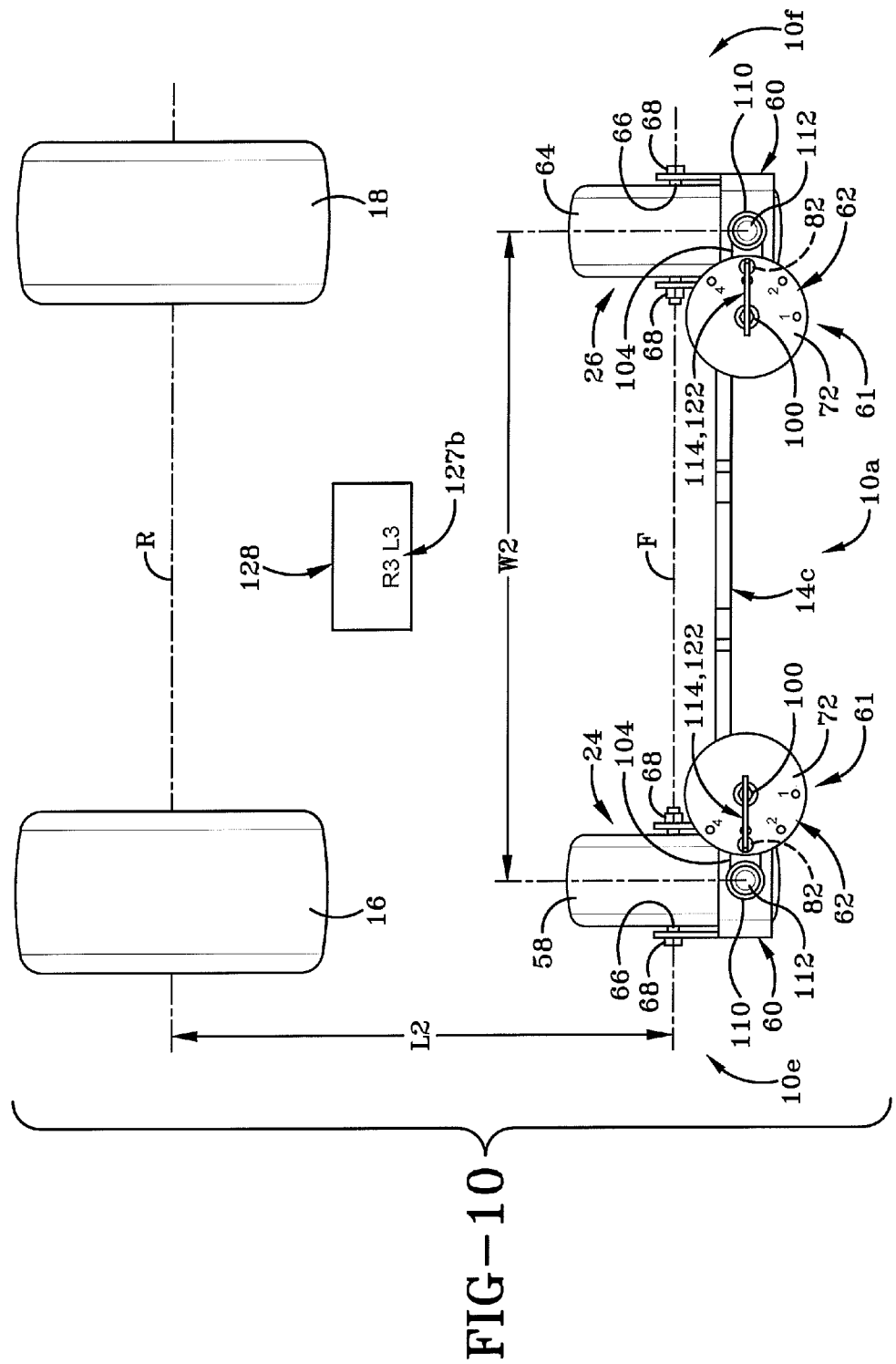
FIG. 10 is a top view of the front wheel assemblies and the rear wheels showing the relative distances between the various wheels when each of the right and left front wheel assemblies are in a second position.
Figure 11:
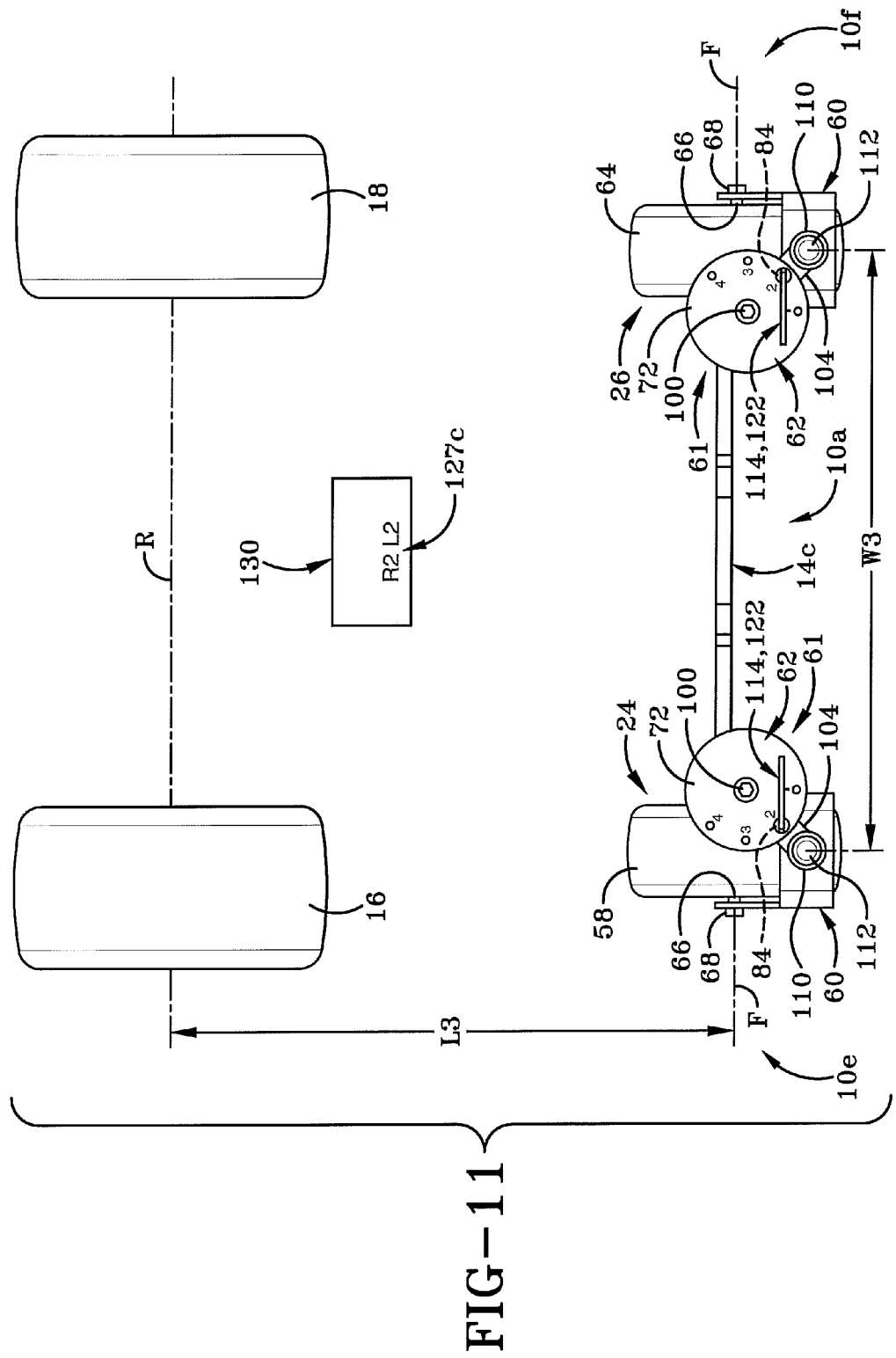
FIG. 11 is a top view of the front wheel assemblies and the rear wheels showing the relative distances between the various wheels when each of the right and left front wheel assemblies are in a third position.
Figure 12:
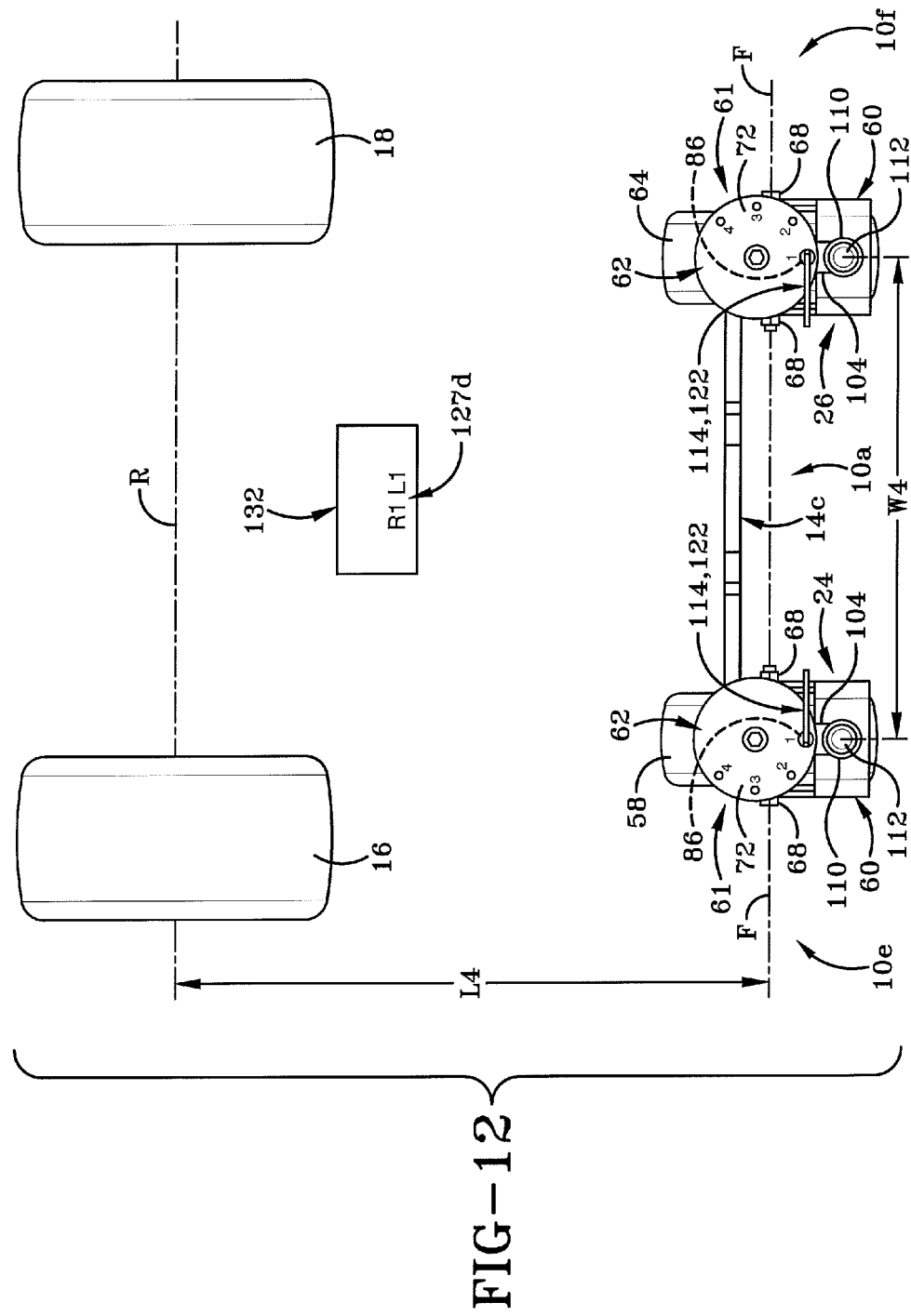
FIG. 12 is a top view of the front wheel assemblies and the rear wheels showing the relative distances between the various wheels when each of the right and left front wheel assemblies are in a fourth position.

Referring to FIGS. 9-13, utility vehicle 10 is used in the following manner. As indicated previously herein, a variety of different attachments, such as snowplow blade 14 (FIG. 1) or edger 54 (FIG. 13) are selectively engageable with support member 15. FIGS. 10, 11, and 12 also show boxes 128, 130, and 132 respectively that are meant to represent other attachments that are potentially selectively engageable with utility vehicle 10. These other attachments could be a forklift assembly, mulcher, snow blower, or mower deck assembly. These boxes 128, 130, 132 are illustrated in a position between rear wheels 16, 18 and front wheel assemblies 24, 26 but the placement is for ease of illustration only and does not represent where the attachments 128, 130 or 132 will necessarily be engaged with utility vehicle. The attachments 128, 130 and 132 may be engaged with front end 10a, rear end 10b, with one or the other sides 10c, 10d or even an underside of vehicle 10.

Each of the attachments 14, 54, 128, 130, 132 is of a different weight and will therefore affect the weight ratio of vehicle 10 differently. Each attachment will therefore have a different impact on the vehicle's stability and performance and thereby on the attachment's own performance. Additionally, differently weighted attachments will place different stresses on frame 14. In order to address some of these issues and in accordance with an aspect of the present invention, right and left front wheel assemblies 24, 26 are adjustable to change the vehicle's wheel base and/or wheel stance. In particular, wheel assemblies 24, 26 are individually and separately adjustable. Specifically, the adjustment of wheel assemblies 24 and 26 is a manual operation performed by the operator of utility vehicle 10.

In accordance with an aspect of the present invention, each of front wheel assemblies 24 and 26 may be moved toward or away from rear wheels 16, 18 and/or toward or away from each other. Each front wheel assembly is independently selectively adjustable.

FIG. 9 shows the wheels of vehicle 10 when a first attachment, snowplow blade 14, is engaged therewith. Wheel assemblies 24 and 26 are in a first position where the wheel assemblies 24, 26 are aligned with each other along axis "F. Rear wheels 16, 18 are aligned along axis "R". This first position is also illustrated in FIGS. 6 and 7 where it can be seen that when the wheels are in the first position, hole 106 in arm 104 is aligned with holes 80/90 in guide plate 62; and pin 114 is inserted through these aligned holes. FIG. 6 shows that the arm 104 is located so that the holes 106 therein are aligned with the holes situated adjacent indicator 126a (FIG. 6)—i.e., the position marked as a "4" on guide plate 62.

FIG. 9 shows that when the wheels are in the first position, arm 104 of wheel assembly 24 is situated at an 11-o'clock position on plate 72 and arm 104 of wheel assembly 26 is situated at a 1-o'clock position. Wheel assembly 24 is thus spaced a distance "W1" laterally from wheel assembly 26. Additionally, the aligned wheel assemblies 24, 26 are spaced a distance "L1" longitudinally from rear wheels 16, 18. Preferably, the distance "W1" is about 39½ inches and the distance "L1" is about 29 inches. When pin 114 is moved to the location marked "4" on both wheel assemblies 24, 26, the change in the distance "W1" and in the distance "L1" occurs simultaneously. Adjustment assembly 61 will be set at position "4" when the heaviest attachment, snowplow blade 14, is engaged with vehicle 10.

If the attachment 14 needs to be replaced with another of the attachments 54, 128, 130, 132, it may be necessary for the operator to make adjustments to the position of one or both front wheel assemblies 24, 26 to accommodate and adjust for the weight of that new attachment. These adjustments change the relative distance between right front wheel assembly 24 and left front wheel assembly 26; and/or between one or both of wheel assemblies 24, 26 and rear wheels 16, 18. The adjustment is made so that the utility vehicle 10 will be best able to engage and operate the selected new attachment while remaining as stable. Adjustments are made to front wheel assemblies 24, 26 that will change the wheel base and/or wheel stance of vehicle 10 so that the weight of the new attachment will not adversely affect the vehicle's center of gravity or the weight ratio, and thereby affect the performance of the vehicle and/or attachment.

So, if the operator is going to change attachment 14 to use vehicle 10 for another function wheel assemblies 24, 26 may be adjusted. The adjustment may be made before the new attachment is engaged with vehicle or the adjustment may be made after the new attachment is engaged with vehicle (but before the vehicle is used to operate the new attachment.) If the operator determines it is necessary to move the wheel assemblies 24, 26 from the position "4" illustrated in FIG. 9 to the position illustrated in FIG. 10, i.e., the position "3" marked on guide plate 62, the first step to making this adjustment is to take the weight of utility vehicle 10 off wheel assemblies 24, 26. This is done by the operator moving joystick 44 (FIG. 8) forwardly in the direction of arrow "A". This motion actuates the hydraulic system and in particular causes piston 48 to extend outwardly from cylinder 46 in the direction of arrow "B". The extension of piston 48 causes support member 15 to pivot downwardly in the same direction as arrow "B" causing front end 10a of utility vehicle 10 to be raised a small distance off ground surface 28 in the direction of arrow "C". As front end 10a is raised, wheels 58, 64 are lifted off the ground in the direction of arrow "C". Because the weight of vehicle 10 is no longer is borne by wheels 58, 64, front wheel assemblies 24, 26 may now be easily adjusted.

Referring to FIGS. 6, 7, 9 and 10, pin 114 is disengaged from guide plate 62. Initially pin 114 engaged in aligned holes 80, 106, 90 of guide plate 62 adjacent the position "4". Grasping handle 122 the operator will rotate pin 114 about an axis "Z" in a first direction that will disengage threaded shaft 118 of pin 114 from its engagement with the threads of nut 103. Pin 114 is lifted out of aligned holes 80, 106, 90 in the direction indicated by arrow "D". The operator will grasp wheel/yoke 58/60 and pivot the same about axis "X" in a first direction indicated by arrow "E" (FIG. 6). (Obviously, adjustment of wheel/yoke 64/60 on left wheel assembly 26 will be performed in an opposite direction to arrow "E" since the two assemblies are mirror images of each other.) Wheel/yolk 58/60 is moved in the direction of arrow "E" until hole 106 aligns with holes 82, 92, for example. In other words, wheel/yolk 58/60 is pivoted until hole 106 is aligned with one of the three other holes on guide plate 62 such as hole represented by indicator 126b (FIG. 6)—i.e., position "3" marked on guide plate 62. This may be the position suitable for attachment 128 to be engaged with vehicle 10. Shaft 118 of pin 114 is inserted into the aligned holes 82, 106, 92 and into the bore of the nut 103 disposed adjacent hole 92. Grasping handle 122, pin 114 is rotated about axis "Z" in a second direction that will engage threads 120 on shaft 118 with the threads of the nut 103 disposed adjacent hole 92. When pin 114 is secured once again within guide plate 62, front wheel assemblies 24, 26 have been moved and locked into the positions illustrated in FIG. 10. In this position "3", arm 104 is at a 3-o'clock position for right front wheel assembly 24 and at a 9-o'clock position for left front wheel assembly 26.

By moving pin 114 to the position "3" on guide plate 62 the distance between rear wheels 16, 18 and front wheel assemblies 24, 26 has changed from "L1" to "L2"; and the distance between wheel assemblies 24 and 26 has changed from "W1" to "W2". It can be seen comparing FIGS. 9 and 10 that the distance "W2" is greater than the distance "W1" and the distance "L2" is greater than distance "L1". The increase in each distance is the result of the difference in the relative positions of the first set of aligned holes 80, 106, 90 and the second set of aligned holes 82, 106, 92 on guide plate 62. In an aspect of the invention, distance "W2" may be about 43 inches and distance "L2" may be about 33 inches. Thus, by moving the pin 114 from position "4" to position "3" on guide plate 62 the wheel stance has increased by from about 3½ inches up to about 4 inches; and the wheel base has increased by around 4 inches. The change in the distance "W2" and in the distance "L2" occurs substantially simultaneously.

The operator may further pivot wheel/yoke 58/60 in the direction "E" to align the hole 106 in arm 104 with either of holes 84/94 (position "2" adjacent indicator 126c) or 86/96, (position "1" adjacent indicator 126d) depending on the wheel base and wheel stance required for any particular one of attachments 54, 128, 130, or 132.

FIG. 11 shows front wheel assemblies 24, 26 both adjusted to position "2" that may be for the engagement of attachment 130. Pin 114 has been previously removed from either of positions "4" or "3" and each of wheel/yoke 58/60 and wheel/yoke 64/60 has been pivoted to bring hole 106 into alignment in holes 84/94 (adjacent indicator 126c). By moving the pin 114 from position "3" to position "2" the distance between rear wheels 16, 18 and wheel assemblies 24, 26 has changed to "L3" and the distance between right front wheel assembly 24 and left front wheel assembly 26 has changed to "W3". Arm 104 sits at about the 7-o'clock position for right front wheel assembly 24 and arm 104 sits at about the 5-o'clock position for left front wheel assembly 26. In an aspect of the invention, distance "W3" may about 39½ inches and distance "L3" may be about 37 inches. Thus, relative to position "3", the wheel stance has decreased by from about 3½ up to about 4 inches and the wheel base has increased by about 4 inches. The change in the distance "W3" and in the distance "L3" again occurs substantially simultaneously.

FIG. 12 shows wheel assemblies 24, 26 adjusted to the position "1" identified by indicator 126d (FIG. 6) in order for attachment 132 to be engaged with vehicle 10. In position "1", pin 114 is engaged in holes 86, 96 and front wheel assemblies 24, 26 are spaced a distance "L4" from rear wheels 16, 18. Front wheel assemblies 24, 26 are spaced a distance "W4" from each other. Arm 104 is the 6-o'clock position for both front wheel assemblies 24, 26. In one aspect of the invention, the distance "W4" may be about 31 inches and the distance "L4" may be about 40 inches. Thus, relative to position "3" the wheel stance has decreased by about 8 inches and the wheel base has increased by about 3 inches. The change in the distance "W1" and in the distance "L1" occurs substantially simultaneously. It should be noted that adjustment assembly 61 may be placed in position "1" when the lightest of the attachments is engaged with vehicle 10.

If it is needful for the operator to adjust the wheel assemblies 24, 26 back to position "4", "3" or "2" then wheel/yoke 58/60 will be pivoted in the direction of arrow "G".

It should be noted that the purpose of enabling right and left front wheel assemblies 24, 26 to be selectively adjustable is in order to change the lever or lever arm length of the forces between the weight of the attachment engaged with vehicle 10 and the weight of the rest of vehicle 10. The weight of the rest of vehicle 10 includes the weight of the operator. The relative change in position between right and left front wheel assemblies 24, 26 is balanced about a pivot point, where the pivot point is the position of the locking member 114 on guide plate 62. The change in the relative position of locking member 114 from one position ("1" to "4") to another changes the effective pivot point in accordance with the one of the attachments 14, 54, 128, 130, or 132 that is to be engaged with vehicle 10. The adjustment in the position of the pivot point effectively changes the balance between the weight of the overhung load relative to the rest of the vehicle's weight including the operator. This ensures that vehicle 10 functions in a stable fashion no matter what the weight of the attachment engaged with vehicle 10. It also ensures that the drive wheels 16, 18 have adequate traction with the ground 28 and that wheels 58, 64 remain free floating and zero turn while adequately supporting the weight balance between the front and back of vehicle 10.

Figure 6A:
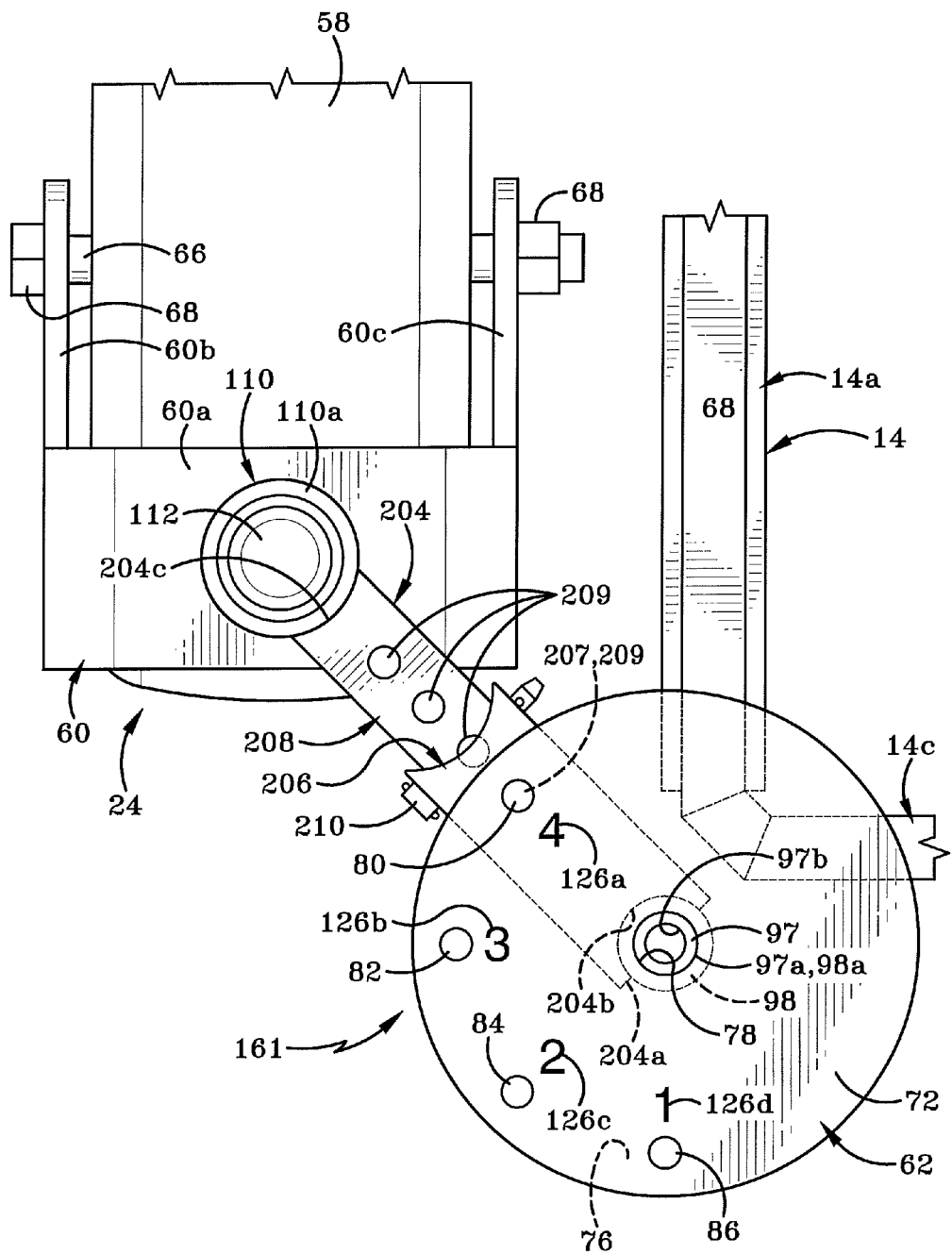
FIG. 6A is an enlarged top view of a second embodiment of the right front wheel assembly (with the pin removed for clarity) showing a telescoping arm connecting the yoke and the guide plate together.

FIG. 6A shows a second embodiment of the adjustment assembly, generally indicated at 161. All of the components of guide plate 62 are the same in adjustment assembly 161 but the configuration of the arm which secures guide plate 62 to yoke 60 is different. In particular, arm, represented by reference number 204, is a telescoping member that is adjustable in length to change the distance between guide plate 62 and wheel 58 and thereby further increase or decrease both the wheel base and wheel stance of vehicle 10. Arm 204 has a first end 204, with curved region 204b that is secured to bushing 98. The second end 204c of arm 204 is secured to sleeve 110.

Figure 8:
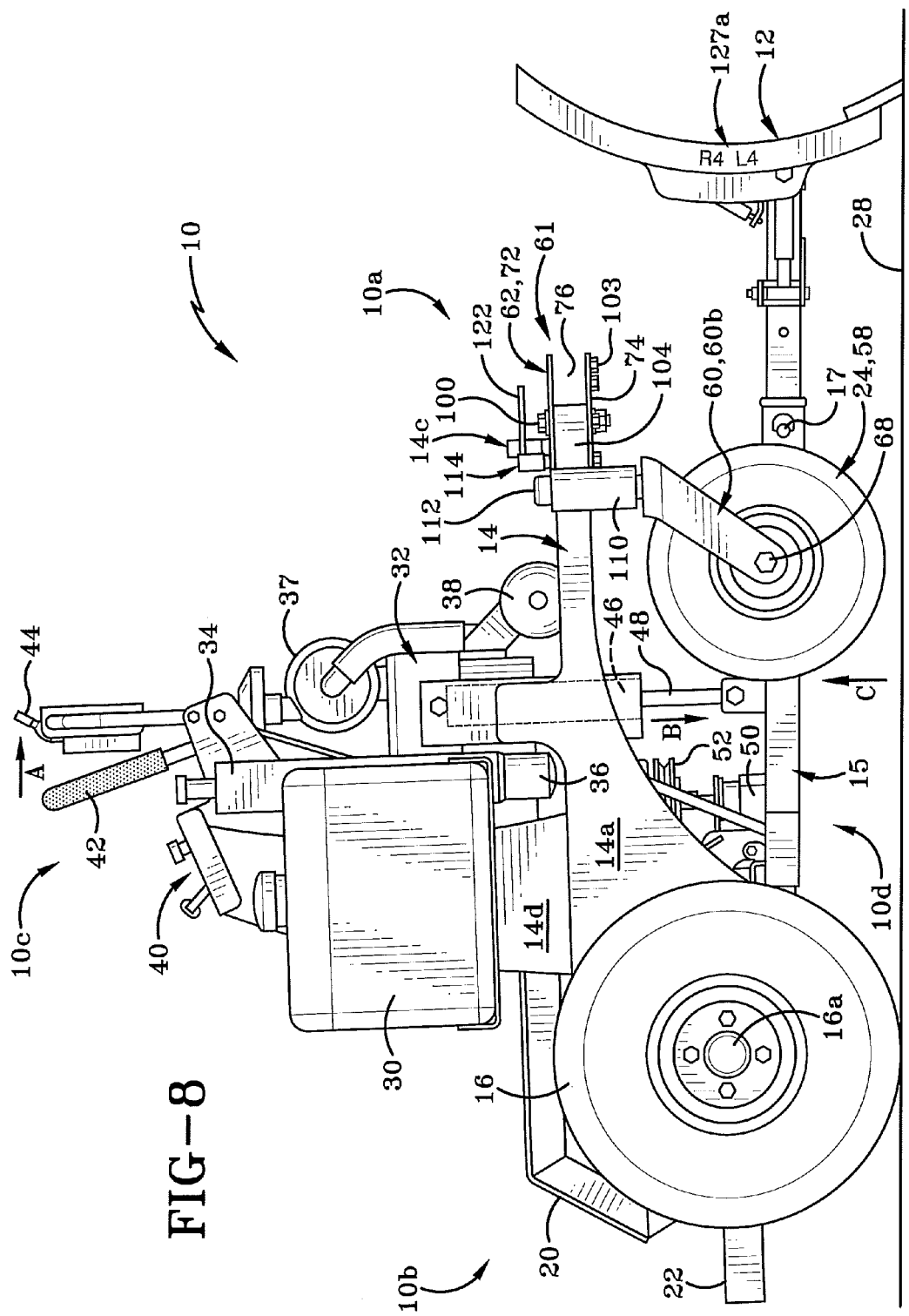
FIG. 8 is a right side view of the utility vehicle with the hydraulic system activated to position the vehicle for adjustment of the right and left wheel assemblies.

When the above-described adjustments have been made to wheel assemblies 24, 26, wheels 58, 64 need to be placed back into engagement with ground surface 28. To that end, the operator will move joystick 44 in the opposite direction to arrow "A" (FIG. 8). This actuates the hydraulic system and causes piston 48 to be withdrawn, at least partially, into cylinder 46 in the opposite direction of arrow "B". The pivotal motion of support bar 15 in response to withdrawal of the piston 48 connected thereto is that front wheel assemblies 24, 26 are lowered toward the ground surface 28 in the direction opposite to arrow "C". This brings wheels 58 and 64 back into contact with ground surface 28. Once the wheel base and wheel stance have been adjusted in the manner described above, it is possible to remove snowplow blade 14 and replace it with another attachment, such as any of attachments 128, 130 or 132.

FIG. 13 shows an instance where a dissimilar adjustment is made to right front wheel assembly 24 from that made to left front wheel assembly 26. This situation arises when it may be desired to engage a side-mounted attachment to utility vehicle 10. An example of this type of side-mounted attachment is edger 54. By way of example only, right front wheel assembly 24 is moved to position "4" in the manner described above, i.e., pin 114 is engaged in hole 80 on the associated guide plate 62. Left front wheel assembly 26 is moved to position "1" where the associated pin 114 is engaged in hole 86. Thus, right front wheel assembly 24 is spaced a distance "L1" from rear wheels 16, 18 and left front wheel assembly 26 is spaced a distance "L4" from rear wheels 16, 18. Right front wheel assembly 24 is thus closer to rear wheels 16, 18 than is left front wheel assembly 26. Additionally, right front wheel assembly 24 is positioned to rotate about an axis "F1" and left front wheel assembly is positioned to rotate about an axis "F2"—i.e., the two wheel assemblies are no longer laterally aligned with each other. The increased distance between left front wheel assembly 26 and rear wheel 18 allows for edger 54 to be engaged with utility vehicle 10 and be driven thereby by way of pulley 52 (FIGS. 1 and 13) and drive belt 56.

It will be understood that any desired configuration may be utilized for right and left front wheel assemblies 24, 26 relative to rear wheels 16, 18 and to each other in order to set up vehicle 10 for engagement of any one of the variety of attachments.

In order to aid in reducing operator error in selecting the incorrect wheel base and wheel stance configuration for any one of the attachments 14, 54, 128, 130, and 132 each component is marked with an indicator 127a (FIG. 1), 127e (FIG. 13), 127b (FIG. 10), 127c (FIG. 11) or 127d (FIG. 12), respectively. Each indicator 127a-127e corresponds to the indicators 126a, 126b, 126c, or 126d on right and left front wheel assemblies 24, 26. For example, in FIG. 1, snowplow blade 14 is marked with the indicator 127a that reads "R4 L4". This directs the operator to set right front wheel assembly 24 at position "4" and to set left front wheel assembly 26 at position "4". In FIG. 10 indicator 127b on attachment 128 reads "R3 L3". This indicator 127b tells the operator to set right front wheel assembly at position "3" and to set left front wheel assembly at position "3". In FIG. 13, indicator 127e on attachment 54 reads "R4 L1". This tells the operator to set right front wheel assembly at position "4" and to set left front wheel assembly at position "1". The operator thus simply matches the indicator 127a-127e on the selected one of the attachments 14, 54, 128, 130, 132 and makes the appropriate changes to the right and left front wheel assemblies 24, 26.

Referring to FIG. 1, it should be noted that FIG. 1 includes the reference character "H". This denotes the operational height of portions of frame 14 that are aligned with bottom plate 74 of guide plate 62 on vehicle 10 relative to ground surface 28 prior to selective adjustment of the wheel base and/or wheel stance of vehicle 10. It should be noted that the operational height "H" of the frame 14 relative to ground surface 28 remains substantially the same prior to and after selective adjustment of one or both of the right and left front wheel assemblies 24, 26 to change the wheel base and/or wheel stance of the vehicle 10. The height "H" remains substantially constant no matter which position "1" through "4" the right and left front wheel assemblies 24, 26 are set at. So, for example, if right and left front wheel assemblies 24, 26 are each set at position "4" and are then adjusted to position "2", the height "H" relative to ground surface 28 at both positions is the same.

It will be understood that guide plate 62 may be provided with more than four aligned pairs of holes or fewer than four aligned pairs of holes so that more than four or less than four adjustment positions for wheel assemblies 24, 26 are provided.

Additionally, the method has been described as the operator utilizing the hydraulic system and the attachment that is engaged with utility vehicle 10 in order to lift wheels 58, 64 off the ground for adjustment of the right and left front wheel assemblies and again for lowering wheels 58, 64 to contact the ground surface 28. It will be understood that other methods of raising or lowering front end 10 of utility vehicle 10 or right and left wheel assemblies themselves may be used instead. For example, a small jack-type device could be integrally provided on vehicle 10, or separately provided therewith, and this jack could be used to lift wheels 58, 64 for adjustment and lower them again. Alternatively, some other separate support such as a block of wood for example, could be positioned in an appropriate location to slightly raise front wheels 58, 64 off the ground surface 28.

It will be understood that while the adjustment of the wheel base and the wheel stance of vehicle 10 has been described herein as a manual operation performed physically by the operator, vehicle 10 could be provided with appropriate electronic and mechanical components so that this adjustment operation could be an automated process. The operator would simply need to enter the appropriate commands on control panel 40. It should be noted that such an automated system could be configured to adjust the right and left wheel assemblies independently of each other or to adjust them at the same time if the adjustment mechanisms are linked to each other.

FIGS. 14 to 21 show a third embodiment of a utility vehicle adjustment mechanism that may be provided on vehicle 10. This third embodiment of the adjustment mechanism functions in much the same way as the first and second embodiments and is used to change the vehicle's wheel base and wheel stance when different attachments are to be engaged with vehicle 10.

The third embodiment of the adjustment mechanism is selectively operatively engaged with right front wheel assembly 24 and left front wheel assembly 26 to secure the same to vehicle frame 14. The adjustment mechanism includes an adjustment assembly 261A (FIG. 14) that engages right front wheel assembly 24 and an adjustment assembly 261B which engages left front wheel assembly 26. The adjustment mechanism also includes a pair of first arms 304 and a pair of second arms 305 that are selectively engageable with first and second adjustment assemblies 261A, 261B.

Adjustment assemblies 261A, 261B perform the same function as adjustment assembly 61 and in much the same manner but adjustment assemblies 261A, 261B are differently configured to adjustment assembly 61. Adjustment assembly 261A includes a guide plate 262A and adjustment assembly 261B includes a guide plate 262B. The structure of adjustment assembly 261A will be described in greater detail but it will be understood that the description applies equally to adjustment assembly 261B.

Figure 19:
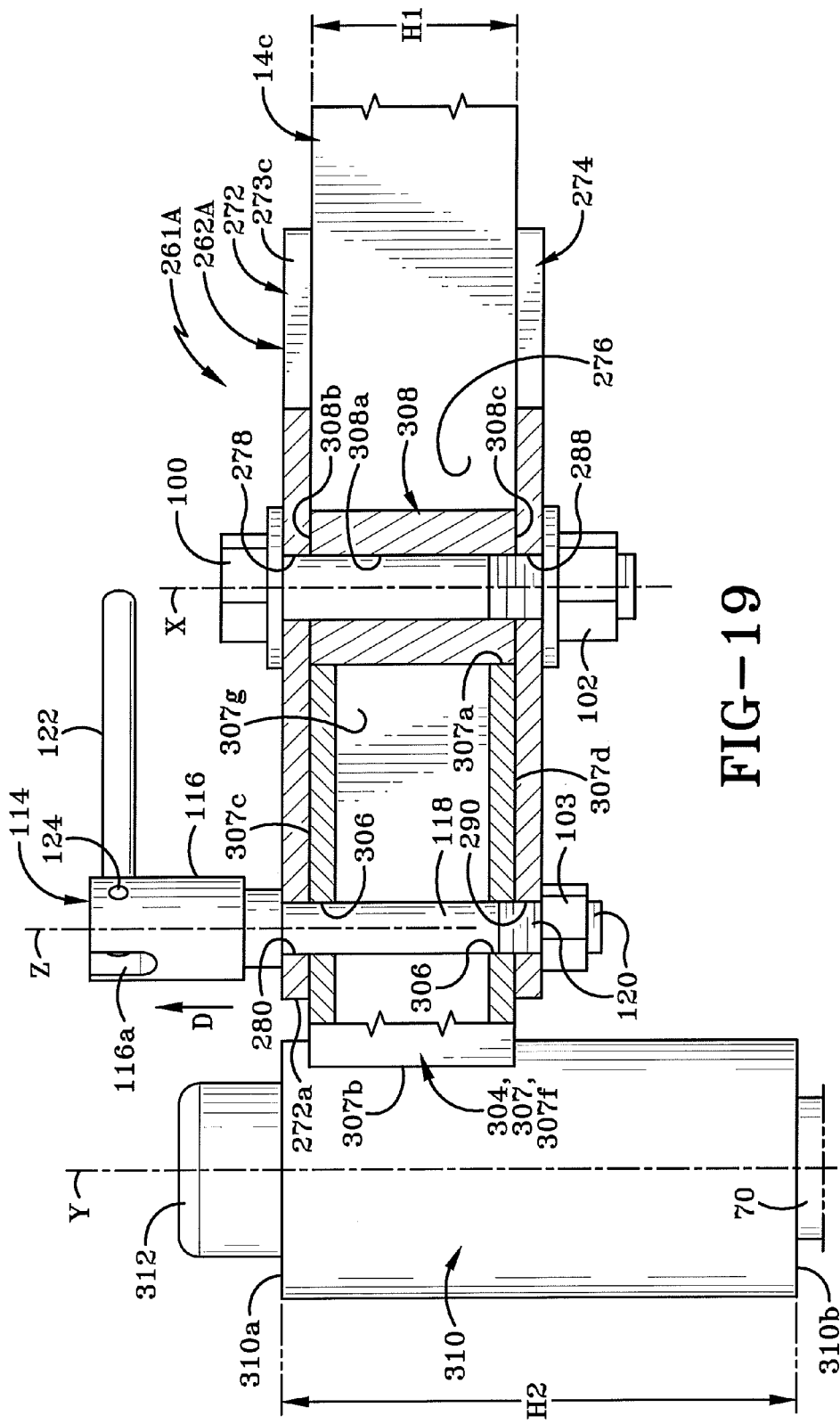
FIG. 19 is a cross-section of the right side front wheel assembly taken along line 19-19 of FIG. 14.

Adjustment assembly 261A includes a guide plate 262A comprised of two spaced-apart discs 272, 274 (FIG. 19). The term "disc" is used simply to name the components and is not to be interpreted as imparting any particular shape or characteristic to the components. Discs 272, 274 are positioned vertically one above the other in a generally parallel orientation. Discs 272, 274 define a gap 276 between them. Portions of frame members 14a and 14c of the vehicle's frame 14 are received in gap 276 and are welded to discs 272 and 274. (Portions of frame members 14b and 14c are received in a similar gap between the discs of guide plate 262B. The welding of frame members 14a, 14c helps keep discs 272, 274 in a fixed relationship relative to each other and to frame 14 and keeps gap 276 at a constant width between discs 272, 274.

Figure 17:
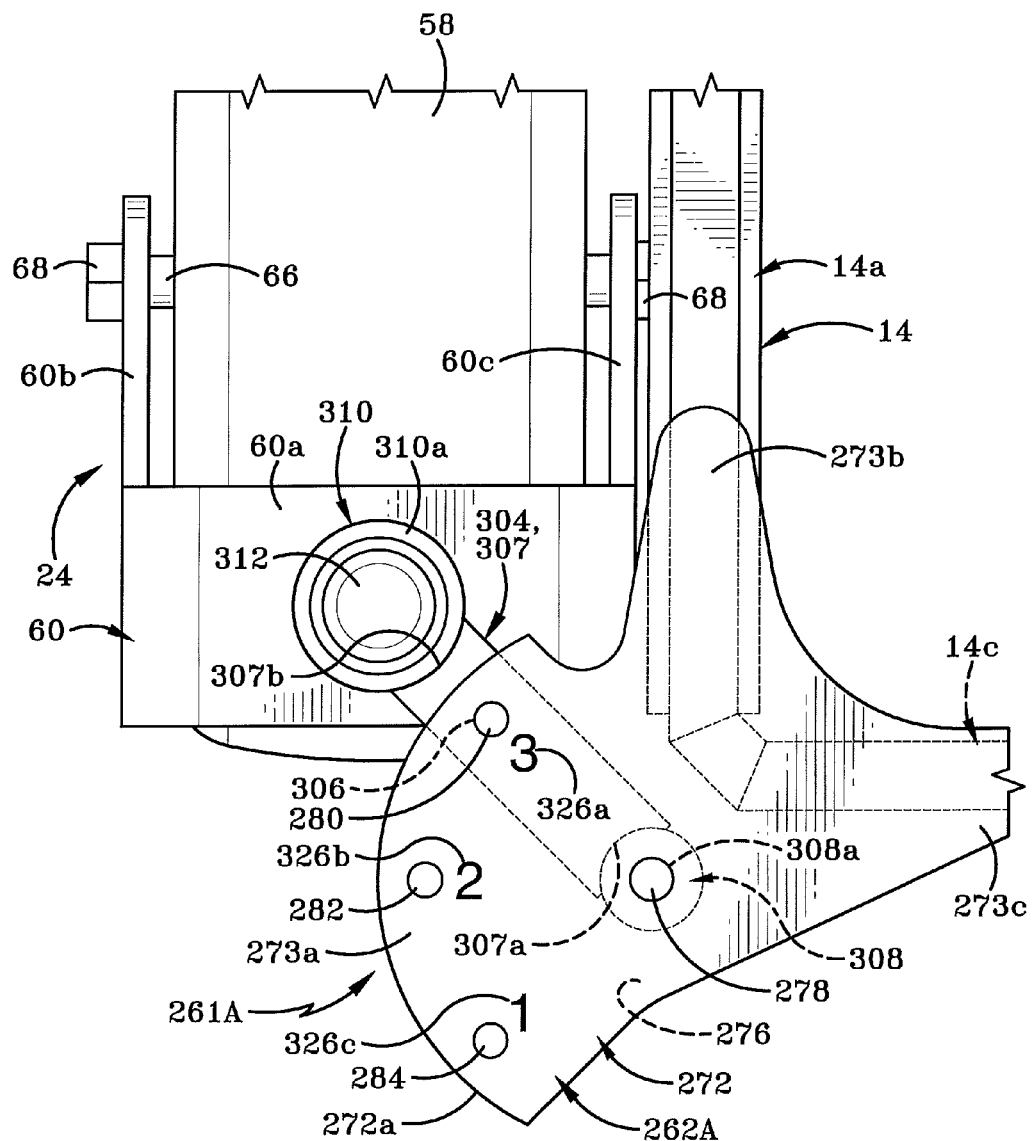
FIG. 17 is an enlarged top view of a right side front wheel assembly.
Figure 18:
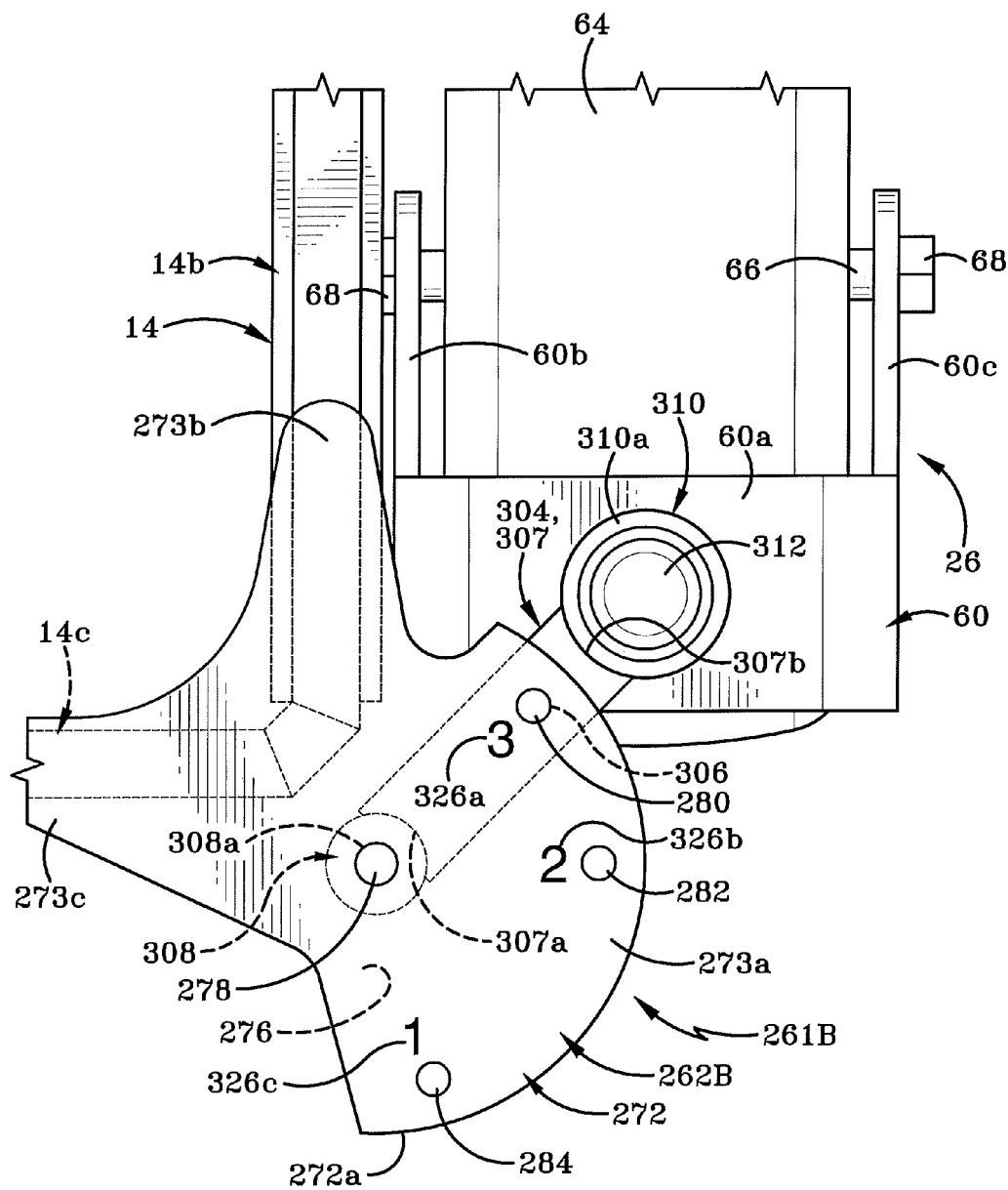
FIG. 18 is an enlarged top view of a left side front wheel assembly.

Referring to FIGS. 4, 14 and 17 it is evident that discs 272, 274 have a different shape to discs 72, 74 of adjustment assemblies 61. Discs 72, 74 are circular in shape while the shape of discs 272, 274 is somewhat loosely Y-shaped. The discs 272, 274 of adjustment assembly 261A may be substantially identical in shape to discs 272, 274 of adjustment assembly 261B but they are secured to frame 14 in such a way that they are mirror images of each other. For ease of description only the particulars of the disc 272 are described hereafter.

Referring to FIG. 17, disc 272 includes an arcuate region 273a, a first projection 273b and a second projection 273c. Arcuate region 273a is generally semi-circular in shape. First projection 273b is fixedly secured to the frame, is generally parabolic in shape and extends outwardly from a first end of arcuate region 273a and along frame member 14a for a distance. Second projection 273c is also generally parabolic in shape and extends outwardly from around a mid-point of the arcuate region 273a and along frame member 14c for a distance. First and second projections 273b, 273c are oriented at about 90° relative to each other and are welded to the portions of frame members 14a, 14c over which they extend.

The shape of discs 272, 274 has advantages over the circular shape of discs 72, 74 in that the discs 272, 274 are lighter in weight because of the material cut away by not using a circular shape. Additionally, the projections 273b, 273c extend for a greater distance along the respective frame members 14a, 14c than do the regions of the circular discs 72, 74 which are welded to frame members 14a, 14c. A greater portion of each disc 272, 274 is welded to the frame 14 and there is therefore a more rigid and stronger connection between plates 272, 274 and frame 14. Guide plates 262A, 262B act as anchor points for the adjustment of the wheel base and wheel stance of vehicle 10. Consequently the stronger the connection between guide plates 262A, 262B and frame 14, the stronger and more durable is the vehicle 10.

Plate 272 defines a generally central hole 278 therein in a location generally between an interior part of arcuate region 273a and projections 273b, 273c. Similarly, plate 274 defines a central hole 288 (FIG. 19) that is vertically aligned with hole 278. Arcuate region 273a of plate 272 defines one or more holes therein that are positioned a spaced distance inwardly from a circumferential outer edge 272a (FIG. 19) of arcuate region 273a. The arcuate region of disc 274 similarly defines one or more holes that are located so as to vertically align with the one or more holes in disc 272. As illustrated, disc 272 defines three spaced apart holes 280, 282, 284 and disc 274 will similarly define three spaced apart holes therein. One of these holes in disc 274, hole 290, is shown in FIG. 19 aligned with hole 280. Holes 280, 282, and 284 are all of substantially the same diameter and are spaced at regular intervals from each other along arcuate region 273a.

A nut 102 may be welded to the underside of disc 274 to make it easier for the operator to engage and disengage bolt 100 through the aligned central holes 278, 280. A hole in the nut 102 will align with holes 278, 280 if this is the case. Additional nuts 103 may be welded to the underside of disc 274 and holes in those nuts 103 will be individually aligned with one of the holes 280, 282, 284.

As with adjustment assembly 61, adjustment assembly 261A is provided with indicators 326a, 326b, and 326c (FIG. 17) on guide plate 262A. Indicators 326a, 326b and 326c are marked on an upper surface of disc 272 to aid the operator in rapidly adjusting the wheel stance and/or wheel base. Indicator 326a comprises the number "1" marked on the upper surface of disc 272 adjacent hole 280; indicator 326b is the number "2" adjacent hole 282, and indicator 326c comprises the number "3" marked on the upper surface of disc 272 adjacent hole 284.

As indicated above, a pair of first arms 304 and a pair of second arms 305 are provided to be selectively engaged with guide plates 262A and 261B. A first arm 304 is illustrated in FIG. 15 and a second arm 305 is illustrated in FIG. 16. First and second arms 304, 305 are substantially identical except that the length "T1" of first arm 304 is less than the length "T2" of second arm 305. Because of their substantially identical structures, only first arm 304 will be described in detail below.

Referring to FIGS. 15 and 19, first arm 304 includes a shaft 307 that is a hollow tubular member which is generally of a square or rectangular cross section. Shaft 307 has a first end 307a, a second end 307b, an upper surface 307c, a lower surface 307d and first and second sides 307e, 307f. Each of the first and second ends 307a, 307b is concavely curved as best shown in FIG. 15. Shaft 307 defines a bore 307g therein which extends from first end 307a to second end 307b. An aperture 306 is defined in each of the upper and lower surfaces 307c, 307d of shaft 307 and these two apertures 306 are vertically aligned with each other.

A side wall of a first sleeve 308 is welded to first end 307a of first arm 307 and a side wall of a second sleeve 310 is welded to second end 307b of first arm 307. First and second sleeves 308, 310 are each hollow tubular members that may be circular in cross section. The side wall of first sleeve 308 is of a height "H1" that is slightly smaller than the depth of gap 276 between the interior surfaces of first and second discs 272 and 274. This enables the first sleeve end of first arm 307 to be inserted into gap 276. The side wall of first sleeve 308 defines a bore 308a therein which extends from an upper surface 308b of sleeve 308 to a lower surface 308c thereof. When first sleeve 308 is engaged with guide plate 262A, bore 308a is aligned with holes 278, 288 and the axis "X" extends along bore 308a of first sleeve 308 from upper plate 272 through to lower plate 274.

Second sleeve 310 may be of a greater diameter than first sleeve 308 (as is illustrated in FIG. 15) and the side wall of second sleeve 310 may be of a greater height "H2" (FIG. 19) than the height "H1" of first sleeve 308. Second sleeve 310 has an upper end 310a and a lower end 310b. A bore 310c (FIG. 15) is defined by the side wall and extends from upper end 310a of second sleeve 310 to lower end 310b thereof.

First sleeve 308 is used to secure first arm 304 to one of guide plates 262A or 262B. First arm 304 is insertable into gap 276 between first and second discs 272, 274 and is moved inwardly until bore 308a of first sleeve 308 is aligned with central apertures 278, 288. The shaft of a bolt 100 is then inserted through aperture 278, bore 308a and aperture 288 and is rotated about axis "X" to engage the threads on the end of bolt 100 into threaded nut 102. Bolt 100 thereby secures a first end of first arm 304 to the respective guide plate 262A or 262B. Nut 102 may be of the type welded to the underside of disc 274 or may be a separate component that is selectively engaged with the threads at the end of bolt 100. When bolt 100 is engaged to secure guide plate 261A or 261B to first arm 304, then right front wheel assembly 24 is able to rotate about axis "X".

Second sleeve 310 is used to secure first arm 304 to right front wheel assembly 24. Bore 310c of second sleeve 310 is sized to receive the shaft 70 of yoke 60 therethrough when first guide plate 262A is engaged with right front wheel assembly 24. Second sleeve 310 of first arm 304 is lowered onto yoke 60 in a position that enables shaft 70 to enter into bore 310c through an opening in the lower end 310b of second sleeve 310. A cap 312 may be inserted into an opening in upper end 310a of sleeve 310 to lock shaft 70 in place within sleeve 310.

FIG. 19 shows an axis "Y" extends centrally along the bore of sleeve 310 and running from upper end 310a of sleeve 310 through to lower end 310b thereof. Shaft 70, yoke 60 and therefore wheel 58 are rotatable about this axis "Y". Shaft 70, yoke 60, and wheel 58 preferably are able to selectively rotate about axis "Y" through about 360°.

Guide plate 262A acts as an anchor for the adjustment of the position of wheel 58 relative to frame 14 and thereby to the other wheel. Similarly, guide plate 262B acts as an anchor for the adjustment of the position of wheel 60 relative to frame 14 and thereby to the other wheels. The operator will set the wheel base and/or wheel stance for vehicle 10 by selecting which one of the first and second arms 304, 305 will be utilized and will select which of the three holes 280, 282, 284 in disc 272 the pin 114 should be inserted into.

FIGS. 14 and 19 illustrate the situation where the operator selects to engage the shorter first arm 304 with each of the first and second guide plates 262A, 262B. Additionally, pins 114 are both inserted into holes 280 of the respective guide plates 262A, 262B. Shaft 118 of pin 114 is inserted through hole 280, through both apertures 306 in shaft 307 of first arm 304, through hole 290 and into the aperture in the nut 103. Pin 114 is rotated about the axis "Z" to engage threads 120 on the end of pin 114 with threaded nut 103 and thus secure pin 114 in position "3" on guide plate 262A. A similar engagement of guide plate 262B and another first arm 304 is accomplished. Because of this engagement, guide plates 262A, 262B are located in the relative positions illustrated in FIG. 14.

First arm 304 is easily replaced by second arm 305. This is accomplished simply by pulling pin 114 out of aligned holes 80, 90 and bore 118; and by pulling bolt 100 out of apertures 278, 288 and bore 308a. First arm 304 is then pulled out from gap 276 between discs 272, 274. First sleeve 308 on second arm 305 is inserted into gap 276 between discs 272, 274 and is positioned so that pin 114 and bolt 100 may be engaged therewith.

Figure 20:
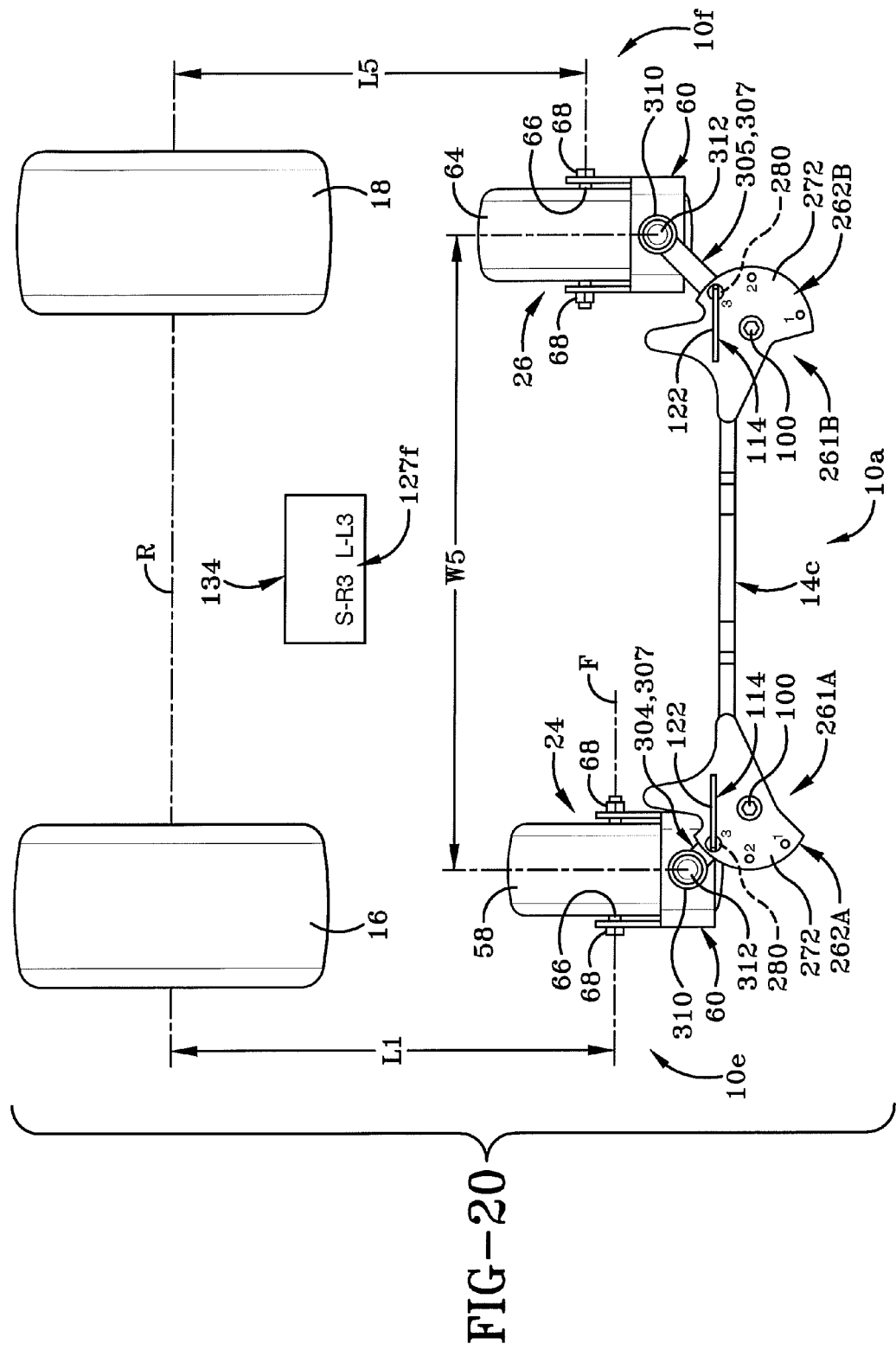
FIG. 20 is a top view of the front and rear wheel assemblies showing a first possible adjustment of the wheel stance and wheel base for the zero turn utility vehicle; with the frame members of the vehicle omitted therefrom for clarity.

FIG. 20 shows an instance where first guide plate 262A is engaged with first arm 304 with pin 114 inserted in position "3". In other words first guide plate 262A is in the same position illustrated in FIG. 14. Second guide plate 262B, however, is engaged by a second arm 305 to left front wheel assembly 26 instead of by a first arm 304. Pin 114 is inserted through hole 280 on second guide plate 262B in position "3". Because of the use of the different length first and second arms 304, 305 right front wheel 58 is located at a distance "L1" from right rear wheel 16 and left front wheel 60 is located at a different distance "L5" from left rear wheel 18. Right front wheel 58 is not laterally aligned with left front wheel 60 and the two wheels 58, 60 are located a distance "W5" away from each other. Therefore, if it is desired to change the wheel base of vehicle 10 when engaging a particular attachment on one side of vehicle 10, the operator is able to select the length arm that will change the wheel stance or wheel base that best suits the attachment. Then when that attachment is no longer needed, the swapped arm can be replaced with the original arm once again.

Figure 21:
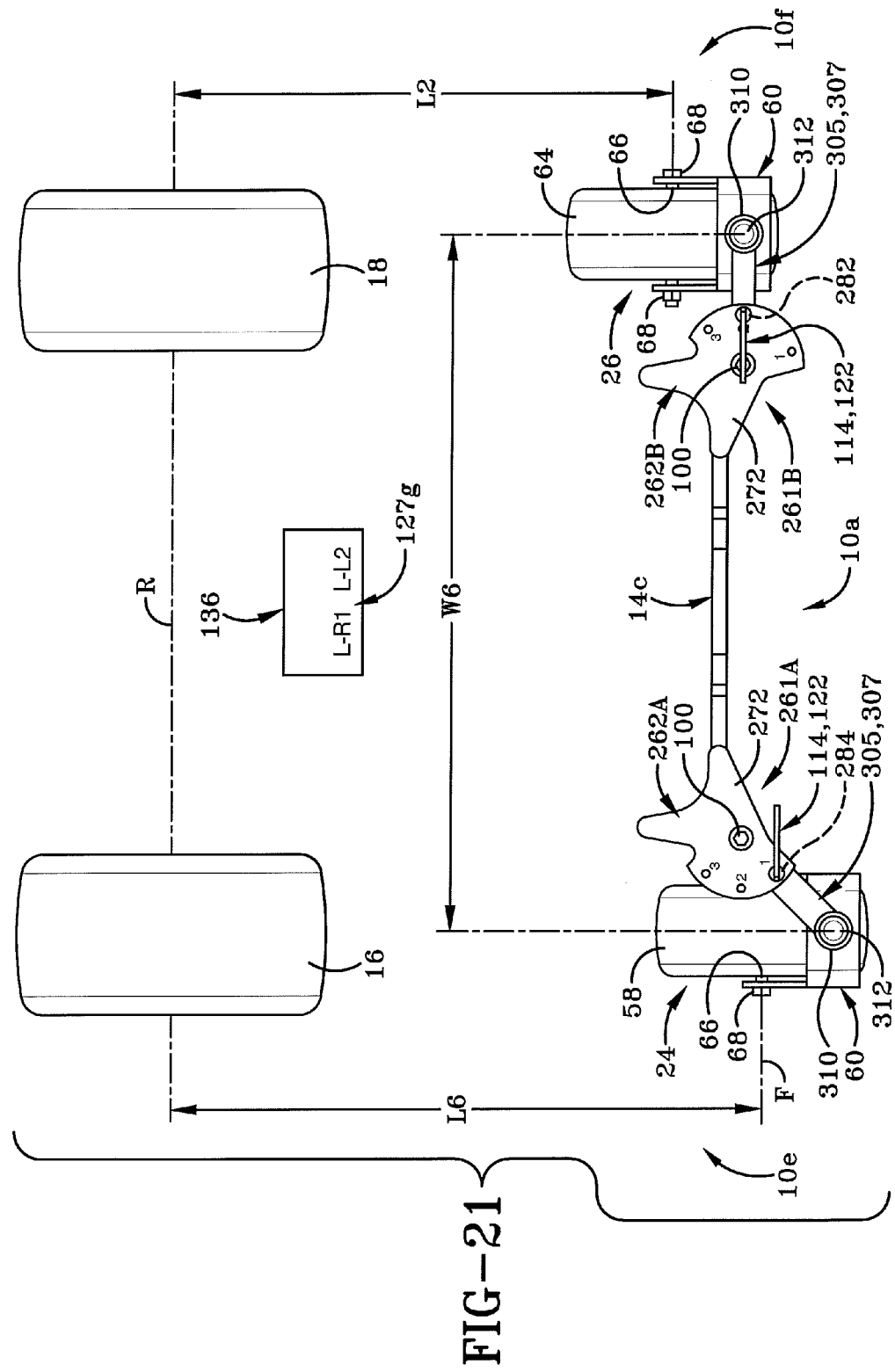
FIG. 21 is a top view of the front and rear wheel assemblies showing a second possible adjustment of the wheel stance and wheel base; with the frame members of the vehicle omitted for clarity.

FIG. 21 shows the wheel base and wheel stance being adjusted by moving pin 114 from one position "1", "2" or "3" to another of these positions when both of the first and second guide plates 262A, 262B are engaged with the longer second arms 305 to the associate wheel assemblies. FIG. 21 shows pin 114 engaged with first guide plate 262A at the position "1" and the other pin 114 engaged with second guide plate 262B at the position "2". The engagement of the first and second guide plates 262A, 262B at different positions results in wheels 58, 64 not being laterally aligned with each other. Consequently, wheel 58 is located a distance "L6" away from rear wheels 16, 18 and wheel 64 is located a distance "L2" from rear wheels 16, 18. Wheels 58, 64 are also located a distance "W6" from each other. "W6" is different to the distance "W5" achieved when different length arms 304, 305 are used for connecting first and second guide plates 262A, 262B.

It is therefore clear that the operator has a wide range of options available to adjust the wheel stance and wheel base because of the provision of the different positions "1", "2", and "3" on guide plates 262A, 262B and the provision of different length first and second arms 304, 305. The wheel base and wheel stance are easily changed simply by moving pins 114 to new positions "1", "2", or "3" on guide plates 262A, 262B and/or by exchanging first and second arms 304, 305 as described above.

It will be noted that if FIG. 19 is compared with FIG. 7, the arm 104 used in FIG. 7 included a bushing 108 which was positioned to align with holes 80, 90. Additional bushings were provided to align with holes 82, 84 and 86 as well. FIG. 19 shows that first arm 304 is not provided with such bushings. It will be understood, however, that bushings may be provided to make it easier to insert the shaft 118 of pin 114 therethrough.

Similarly, in FIG. 7, a bushing 97 was provided to make it easier for the shaft of bolt 100 to be inserted through the aligned center holes. It will be understood that a bushing may similarly be provided in to line bore 308a of first sleeve 308 to make it easier to insert the shaft of bolt 100 therethrough.

It will further be understood that instead of a tubular first sleeve 308 being provided at first end 307a of first arm 304, shaft 307 may simply be of a uniform shape and construction along its length with first sleeve 308 being omitted and holes 278, 288 may simply be drilled through upper and lower surfaces 307c, 307d of shaft 307.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the aspects of the invention are an example and the invention is not limited to the exact details shown or described.

The invention claimed is:

1. A utility vehicle comprising:
a frame having a pair of rear wheels mounted thereon;
a right front wheel assembly and a left front wheel assembly;
an adjustment assembly for mounting each of the right and left front wheel assemblies to the frame and wherein the adjustment assembly selectively changes a position of the associated right or left front wheel assembly relative to the rear wheels or to each other; wherein each adjustment assembly includes a first arm of a fixed first length and a second arm of a fixed second length; and wherein one or the other of the first and second arms operatively engages the associated right or left front wheel assembly to the frame.

2. The utility vehicle as defined in claim 1, further comprising a guide plate engaged with the frame; and wherein the selected first or second arm is engaged with the associated right or left front wheel assembly.

3. The utility vehicle as defined in claim 2, wherein a first end of the selected first or second arm is detachably engaged with the associated right or left front wheel assembly.

4. The utility vehicle as defined in claim 3, wherein a second end of the selected first or second arm is engaged with the associated one of the right or left wheel assemblies.

5. The utility vehicle as defined in claim 2, wherein the guide plate defines a first hole therein and a second hole therein and the first and second holes are spaced from each other; and wherein the adjustment assembly includes a pin; and the pin is inserted through an aperture in the second end of the selected first or second arm and through one or the other of the first and second holes in the guide plate.

6. The utility vehicle as defined in claim 5, wherein the guide plate defines an additional hole therein and the pin is selectively inserted through the aperture in the second end of the selected first or second arm and through the additional hole.

7. The utility vehicle as defined in claim 6, wherein the first hole, second hole and additional hole are located at regular intervals from each other on the guide plate.

8. The utility vehicle as defined in claim 7, wherein the first hole, second hole and additional hole are arranged in an arcuate pattern.

9. The utility vehicle as defined in claim 2, wherein the guide plate includes a first projection that extends for a distance outwardly along a first portion of the frame.

10. The utility vehicle as defined in claim 9, wherein the first projection is fixedly secured to the frame.

11. The utility vehicle as defined in claim 10, wherein the guide plate further comprises a second projection spaced from the first projection and the second projection extends along a second portion of the frame and is secured thereto.

12. The utility vehicle as defined in claim 2, wherein the guide plate further defines a central hole and a bolt secures a first end of the selected first and second arm to the guide plate and thereby to the frame.

13. The utility vehicle as defined in claim 12, further comprising a second guide plate located parallel to and spaced apart from the guide plate; and wherein the first end of the selected one of the first and second arms is received between the guide plate and the second guide plate.

14. The utility vehicle as defined in claim 13, wherein the second guide plate is secured to the frame.

15. An adjustment assembly for securing a wheel assembly to a frame of a zero-turn utility vehicle, said adjustment assembly comprising:
a guide plate adapted to be secured to the frame of the vehicle;
a first arm of a fixed first length; and
a separate and different second arm of a fixed second length; and wherein one or the other of the first and second arms is selectively engageable between the guide plate and the wheel assembly.

16. The adjustment assembly as defined in claim 15, further comprising a second guide plate located spaced apart and parallel to guide plate such that a gap is defined between the guide plate and the second guide plate; and wherein the second guide plate is adapted to be secured to the frame of the vehicle; and wherein the selected one of the first and second arms is received in the gap and is detachably secured to the guide plate and second guide plate.

17. A method of adjusting a wheel base or wheel stance of a utility vehicle comprising the steps of:
securing first and second guide plates to a front portion of a frame of the utility vehicle a distance apart from each other;

providing a pair of first arms of a fixed first length and a separate and different pair of second arms of a fixed second length;
selecting a first one of the pair of first arms or of the pair of second arms;
engaging the selected first one of the pair of first or second arms with a first wheel assembly and the first guide plate;
selecting a second one of the pair of first arms or of the pair of second arms;
engaging the selected second one of the pair of first or second arms with a second wheel assembly and the second guide plate.

18. The method as defined in claim 17, further comprising the step of:
engaging a first fastener with a first end of the selected first one of the pair of first or second arms and the first guide plate; and
engaging a second fastener with a first end of the selected second one of the pair of first or second arms and the second guide plate.

19. The method as defined in claim 17, further comprising the step of engaging a second end of the selected first one of the pair of first or second arms and the first wheel assembly and engaging a second end of the selected second one of the pair of first or second arms with the second wheel assembly.

20. The method as defined in claim 17, further comprising the step of:
selecting one of a plurality of spaced apart apertures in the first guide plate;
engaging a first fastener through an aperture defined in the selected first one of the pairs of first and second arms and into the selected one of the plurality of spaced apart apertures in the first guide plate;
selecting one of a plurality of spaced apart apertures in the second guide plate; and
engaging a second fastener through an aperture defined in the selected second one of the pairs of first and second arms and into the selected one of the plurality of spaced apart apertures in the second guide plate.

21. The method as defined in claim 17, further comprising:
disengaging the selected first one of the pair of first or second arms from the first wheel assembly and the first guide plate; and
engaging the other of the first arm or the second arm with the first wheel assembly and the first guide plate.

22. The method as defined in claim 17, further comprising:
disengaging the selected second one of the pair of first or second arms from the second wheel assembly and the second guide plate; and
engaging the other of the first arm or the second arm with the second wheel assembly and the second guide plate.

\* \* \* \* \*